US010521125B2

(12) United States Patent
Takegawa et al.

(10) Patent No.: US 10,521,125 B2
(45) Date of Patent: Dec. 31, 2019

(54) STORAGE SYSTEM, STORAGE MANAGEMENT APPARATUS, AND NON-TRANSITORY COMPUTER-READABLE STORAGE MEDIUM STORING PROGRAM OF CONTROLLING DATA RELOCATION

(71) Applicant: FUJITSU LIMITED, Kawasaki-shi, Kanagawa (JP)

(72) Inventors: Hiroto Takegawa, Numazu (JP); Kanji Miura, Okazaki (JP); Hidemasa Hatano, Susono (JP); Kazuyoshi Watanabe, Tagata (JP); Takashi Kawada, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 254 days.

(21) Appl. No.: 15/596,263

(22) Filed: May 16, 2017

(65) Prior Publication Data

US 2018/0011640 A1    Jan. 11, 2018

(30) Foreign Application Priority Data

Jul. 8, 2016    (JP) ................................ 2016-135890

(51) Int. Cl.
*G06F 3/06* (2006.01)
(52) U.S. Cl.
CPC .......... *G06F 3/0611* (2013.01); *G06F 3/0625* (2013.01); *G06F 3/0634* (2013.01); *G06F 3/0647* (2013.01); *G06F 3/0683* (2013.01)
(58) Field of Classification Search
CPC .... G06F 3/0647; G06F 3/0625; G06F 3/0634; G06F 3/065; G06F 3/0653; G06F 3/0683; G06F 3/0611; G06F 3/0622; G06F 3/0629; G06F 3/0631; G06F 3/0637
USPC ................. 711/162, 165, E12.002, 100, 170
See application file for complete search history.

(56) References Cited

U.S. PATENT DOCUMENTS

| 9,454,317 | B2 * | 9/2016 | Ishizaki ................ G06F 3/0685 |
| 2007/0283090 | A1 | 12/2007 | Kaji et al. |
| 2016/0276008 | A1 * | 9/2016 | Saida .................. G11C 11/1659 |

FOREIGN PATENT DOCUMENTS

| JP | 2007-328468 | 12/2007 |
| JP | 2013-210930 | 10/2013 |

* cited by examiner

*Primary Examiner* — Tuan V Thai
*Assistant Examiner* — Edward Waddy, Jr.
(74) *Attorney, Agent, or Firm* — Staas & Halsey LLP

(57) ABSTRACT

A storage system includes a first storage apparatus including a first storage portion and a second storage portion, a second storage apparatus including a third storage portion and a fourth storage portion, and a storage management apparatus including a processor configured to control the first storage apparatus in an active state and control the second storage apparatus in a standby state, cause the first storage apparatus to execute first data relocation processing, cause the second storage apparatus to execute second data relocation processing, cause the first storage apparatus to suspend the first data relocation processing and cause the second storage apparatus to continue the second data relocation processing, switch the first storage apparatus from the active state to the standby state and switch the second storage apparatus from the standby state to the active state, and cause the first storage apparatus to resume the first data relocation processing.

20 Claims, 21 Drawing Sheets

| POLICY NAME | EVALUATION STANDARD | EVALUATION PERIOD | RELOCATION LIMIT TIME |
|---|---|---|---|
| POLICY #01 | PEAK | 7 DAYS | 24 HOURS |
| POLICY #02 | PEAK | 4 DYAS | 4 HOURS |
| POLICY #03 | PEAK | 12 HOURS | 12 HOURS |
| POLICY #04 | AVERAGE | 24 HOURS | 4 HOURS |

FIG. 7

| AUTOMATED TIERED POOL NAME | APPLIED POLICY | SUB-POOL (LOW-SPEED) | SUB-POOL (MEDIUM-SPEED) | SUB-POOL (HIGH-SPEED) |
|---|---|---|---|---|
| POOL #01 | POLICY #01 | SUB-POOL #01_L | SUB-POOL #01_M | SUB-POOL #01_H |
| POOL #03 | POLICY #02 | SUB-POOL #03_L | SUB-POOL #03_M | SUB-POOL #03_H |

| VIRTUAL LOGICAL VOLUME NAME | AUTOMATED TIERED POOL NAME | LOW-SPEED ALLOCATION RATIO | MEDIUM-SPEED ALLOCATION RATIO | HIGH-SPEED ALLOCATION RATIO |
|---|---|---|---|---|
| FTV #01 | POOL #01 | 10 | 10 | 80 |
| FTV #03 | POOL #03 | 30 | 30 | 40 |

| MAIN-SYSTEM STORAGE APPARATUS | | | SUB-SYSTEM-STORAGE APPARATUS | | |
|---|---|---|---|---|---|
| GROUP NAME | SERIAL NUMBER | PORT NAME | GROUP NAME | SERIAL NUMBER | PORT NAME |
| GROUP #1 | #1111 | PORT #0 | GROUP #2 | #2222 | PORT #0 |
| GROUP #1 | #1111 | PORT #1 | GROUP #2 | #2222 | PORT #1 |

| SERIAL NUMBER | GROUP NAME | STATES |
|---|---|---|
| #1111 | GROUP #1 | ACTIVE |
| #2222 | GROUP #2 | STANDBY |

| FTRPE NUMBER | AVERAGE IOPS | PEAK IOPS | MEASUREMENT TIME (H) |
|---|---|---|---|
| FTRPE#1 | 1000 | 3000 | 5 |
| FTRPE#2 | 100 | 400 | 5 |
| FTRPE#3 | 50 | 1000 | 5 |
| FTRPE#4 | 3 | 10 | 5 |

| FTRPE NUMBER | RELOCATION SOURCE SUB-POOL | RELOCATION DESTINATION SUB-POOL | RELOCATION SITUATION |
|---|---|---|---|
| FTRPE#1 | SUB-POOL#01_L | SUB-POOL#01_H | COMPLETED |
| FTRPE#1 | SUB-POOL#01_H | SUB-POOL#01_M | UNDER EXECUTION |
| FTRPE#1 | SUB-POOL#01_M | SUB-POOL#01_L | UNCOMPLETED |
| FTRPE#1 | SUB-POOL#01_H | SUB-POOL#01_L | UNCOMPLETED |

| FTRPE NUMBER | RELOCATION SOURCE SUB-POOL | RELOCATION DESTINATION SUB-POOL |
|---|---|---|
| FTRPE#3 | SUB-POOL#01_M | SUB-POOL#01_L |
| FTRPE#3 | SUB-POOL#01_H | SUB-POOL#01_L |

STORAGE SYSTEM, STORAGE MANAGEMENT APPARATUS, AND NON-TRANSITORY COMPUTER-READABLE STORAGE MEDIUM STORING PROGRAM OF CONTROLLING DATA RELOCATION

CROSS-REFERENCE TO RELATED APPLICATION

This application is based upon and claims the benefit of priority of the prior Japanese Patent Application No. 2016-135890, filed on Jul. 8, 2016, the entire contents of which are incorporated herein by reference.

FIELD

The embodiments discussed herein are related to a storage system, a storage management apparatus, and a non-transitory computer-readable storage medium.

BACKGROUND

There is a storage system that has a failover function by including redundantly configured storage apparatuses. Some storage apparatus is mounted with different kinds of drives mixedly to perform automated storage tiering by controlling storage locations of data so as to optimize access performance and data storage cost. A storage management apparatus manages execution of the automated storage tiering by instructing the storage apparatus to perform detection of an access frequency of data and data relocation corresponding to the access frequency. As a related art document, there is Japanese Laid-open Patent Publication No. 2013-210930.

SUMMARY

According to an aspect of the invention, a storage system includes a first storage apparatus including a first storage portion and a second storage portion, the first storage portion being accessible at first access speed higher than second access speed at which the second storage portion is accessible, a second storage apparatus including a third storage portion and a fourth storage portion, the third storage portion being accessible at third access speed higher than fourth access speed at which the fourth storage portion is accessible, the second storage apparatus being configured to store data that is the same as data stored in the first storage device, and a storage management apparatus including a memory and a processor coupled to the memory and configured to control the first storage apparatus in an active state and control the second storage apparatus in a standby state, cause the first storage apparatus to execute first data relocation processing between the first storage portion and the second storage portion, cause the second storage apparatus to execute second data relocation processing between the third storage portion and the fourth storage portion, when the first data relocation processing is not completed and the second data relocation processing is not completed when a first condition is satisfied, cause the first storage apparatus to suspend the first data relocation processing and cause the second storage apparatus to continue the second data relocation processing, after the second data relocation processing is completed, switch the first storage apparatus from the active state to the standby state and switch the second storage apparatus from the standby state to the active state, and after the first storage apparatus switches from the active state to the standby state, cause the first storage apparatus to resume the first data relocation processing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a policy management table according to the second embodiment;

FIG. 7 is a diagram illustrating an example of an automated tiered pool management table according to the second embodiment;

FIG. 8 is a diagram illustrating an example of a virtual logical volume management table according to the second embodiment;

FIG. 9 is a diagram illustrating an example of a group information management table according to the second embodiment;

FIG. 10 is a diagram illustrating an example of an operation mode information management table according to the second embodiment;

FIG. 18 is a diagram illustrating an example of a performance information file according to the second embodiment;

FIG. 19 is a diagram illustrating an example of a relocation information file according to the second embodiment;

FIG. 20 is a diagram illustrating an example of a suspension information file according to the second embodiment.

DESCRIPTION OF EMBODIMENTS

A storage management apparatus sometimes causes a storage apparatus, which is executing data relocation, to suspend the data relocation in order to maintain access performance expected for the storage system. However, although the storage apparatus suspending the data relocation may temporarily maintain the access performance, the storage apparatus may fail to meet the expected access performance due to the necessity to perform the suspended remaining data relocation.

Embodiments are explained in detail below with reference to the drawings.

First Embodiment

Figure 1:
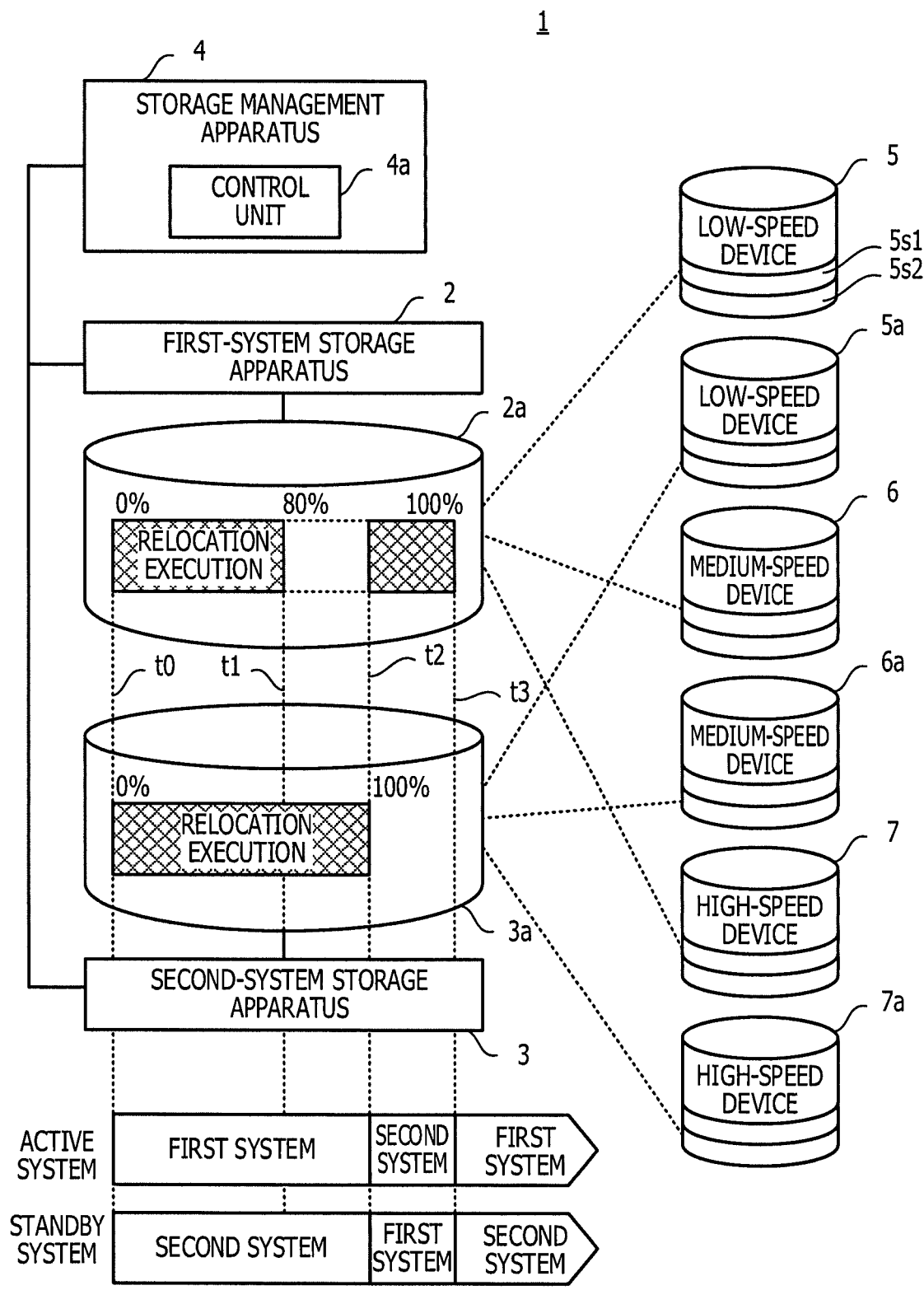
FIG. 1 is a diagram illustrating an example of the configuration of a storage system according to a first embodiment.

First, a storage system according to a first embodiment is explained with reference to FIG. 1. FIG. 1 is a diagram illustrating an example of the configuration of the storage system according to the first embodiment.

A storage system 1 includes a first-system storage apparatus 2, a second-system storage apparatus 3, and a storage management apparatus 4. The first-system storage apparatus 2 and the second-system storage apparatus 3 store data in response to requests from a host apparatus and a job server not illustrated in FIG. 1.

The storage system 1 is capable of handing over processing from an active-system storage apparatus to a standby-system storage apparatus according to a cluster configuration. For example, when the first-system storage apparatus 2 is the active-system storage apparatus, the second-system storage apparatus 3 is the standby-system storage apparatus. When the first-system storage apparatus 2 is the standby-system storage apparatus, the second-system storage apparatus 3 is the active-system storage apparatus.

The storage system 1 includes a plurality of storage devices (low-speed devices 5 and 5a, medium-speed devices 6 and 6a, and high-speed devices 7 and 7a) having different levels of performance. The storage system 1 includes a layer structure in which the low-speed devices 5 and 5a are a low-speed storage type (layer), the medium-speed devices 6 and 6a are a medium-speed storage type, and the high-speed devices 7 and 7a are a high-speed storage type. The low-speed devices 5 and 5a are storage devices that are low in access speed compared with the medium-speed devices 6 and 6a and are, for example, large-capacity and low-cost near line disks capable of reducing data storage cost. The high-speed devices 7 and 7a are storage devices that are high in access speed but high in cost compared with the medium-speed devices 6 and 6a and are, for example, solid state drives (SSDs) capable of reducing a response time. The medium-speed devices 6 and 6a are storage devices having intermediate performance between the performance of the low-speed devices 5 and 5a and the high-speed devices 7 and 7a and are, for example, online disks. Note that the storage devices may be provided integrally with the first-system storage apparatus 2 and the second-system storage apparatus 3, may be provided separately from the first-system storage apparatus 2 and the second-system storage apparatus 3, or may be coupled to the first-system storage apparatus 2 and the second-system storage apparatus 3 via a network.

The storage system 1 is capable of locating data for each of blocks serving as allocation units of storage resources. The storage system 1 may achieve optimization of access performance and cost (data storage cost) by controlling a storage location of data according to automated storage tiering and performing relocation of the data corresponding to an access mode. For example, the low-speed device 5 is capable of locating data for each of blocks 5s1 and 5s2. The low-speed device 5a, the medium-speed devices 6 and 6a, and the high-speed devices 7 and 7a are capable of locating data in the same manner as the low-speed device 5 locates data.

The first-system storage apparatus 2 manages a virtual logical volume 2a. The virtual logical volume 2a receives allocation of blocks from the low-speed device 5, the medium-speed device 6, and the high-speed device 7 and locates data. On the other hand, the second-system storage apparatus 3 manages a virtual logical volume 3a. The virtual logical volume 3a receives allocation of blocks from the low-speed device 5a, the medium-speed device 6a, and the high-speed device 7a and locates data.

The storage management apparatus 4 manages automated storage tiering of the storage system 1. The storage management apparatus 4 includes a control unit 4a that controls data relocation in the automated storage tiering. The control unit 4a sets the first-system storage apparatus 2 as the active-system storage apparatus, sets the second-system storage apparatus 3 as the standby-system storage apparatus, and causes the first and second-system storage apparatuses 2 and 3 to start the data relocation.

The control unit 4a monitors satisfaction of suspension conditions for the data relocation. For example, as the suspension conditions for the data relocation, there is a condition that the control unit 4a causes the first-system storage apparatus 2 or the second-system storage apparatus 3 to suspend the data relocation when the first-system storage apparatus 2 or the second-system storage apparatus 3 does not complete the data relocation within a limit time. Note that, if the data relocation is kept suspended, optimization of access performance and data storage cost expected by completion of the data relocation may not be able to be achieved. Therefore, the storage system 1 desirably resumes the data relocation as early as possible.

Note that the suspension conditions for the data relocation may be set in advance (for example, during factory shipment or during installation) or may be set before the data relocation or during the data relocation. The setting of the suspension conditions for the data relocation may be performed by an operator or may be performed by the control unit 4a according to execution environment conditions in the data relocation.

The control unit 4a performs the following processing if the data relocation by the first-system storage apparatus 2 is not completed and if the data relocation by the second-system storage apparatus 3 is not completed when the suspension conditions for the data relocation are satisfied. The control unit 4a causes the second-system storage apparatus 3, which is the standby-system storage apparatus, to continue the data relocation without suspending the data relocation. Further, the control unit 4a causes the first-system storage apparatus 2, which is the active-system storage apparatus, to suspend the data relocation. Consequently, the storage system 1 may suppress deterioration in the access performance of the first-system storage apparatus 2, which is the active-system storage apparatus. On the other hand, the storage system 1 may continue the data relocation in the second-system storage apparatus 3, which is the standby-system storage apparatus. That is, the storage system 1 continues the data relocation in the standby-system storage apparatus while suppressing deterioration in the access performance in the active-system storage apparatus.

After the data relocation by the second-system storage apparatus 3 is completed, the control unit 4a switches the first-system storage apparatus 2 from the active-system storage apparatus to the standby-system storage apparatus (failover). At this point, the control unit 4a switches the second-system storage apparatus 3 from the standby-system storage apparatus to the active-system storage apparatus. The control unit 4a causes the first-system storage apparatus 2, which is switched to the standby-system storage apparatus, to resume the data relocation. Consequently, the storage system 1 may realize expected access performance and realize optimization of data storage cost for the second-system storage apparatus 3, in which the data relocation is completed.

Since the first-system storage apparatus 2 is switched to the standby-system storage apparatus, the storage system 1 may perform the data relocation by the first-system storage apparatus 2 without affecting the performance of the storage system 1.

Note that, after the data relocation by the first-system storage apparatus 2 is completed, the control unit 4a may switch the second-system storage apparatus 3 from the active-system storage apparatus to the standby-system storage apparatus (failback). At this point, the control unit 4a switches the first-system storage apparatus 2 from the standby-system storage apparatus to the active-system storage apparatus. Consequently, the control unit 4a may set the first-system storage apparatus 2 as the active-system storage apparatus, set the second-system storage apparatus 3 as the standby-system storage apparatus, and complete the data relocation.

In this way, even the suspension conditions for the data relocation are satisfied, the storage system 1 sets one of the first-system storage apparatus 2 and the second-system storage apparatus 3 as the standby-system storage apparatus and continues the data relocation. The storage system 1 sets the other storage apparatus, which has suspended the data relocation, as the active-system storage apparatus to suppress deterioration in access performance. Therefore, the storage system 1 may continue the data relocation while suppressing deterioration in access performance. The storage system 1 may achieve optimization of access performance and optimization of data storage cost, which are expected purposes of the automated tiering.

In the storage system 1, for example, at timing to, the first-system storage apparatus 2 functions as the active-system storage apparatus and starts the data relocation and the second-system storage apparatus 3 functions as the standby-system storage apparatus and starts the data relocation. If the suspension conditions are satisfied when a progress degree of the data relocation by the first-system storage apparatus 2 is 80% (timing t1), the first-system storage apparatus 2 suspends the data relocation. At this point, the second-system storage apparatus 3 continues the data relocation without suspending the data relocation. When the second-system storage apparatus 3 completes the data relocation at timing t2, the first-system storage apparatus 2 switches from the active-system storage apparatus to the standby-system storage apparatus and the second-system storage apparatus 3 switches from the standby-system storage apparatus to the active-system storage apparatus. The first-system storage apparatus 2 switched to the standby-system storage apparatus resumes the suspended data relocation.

When the first-system storage apparatus 2 completes the data relocation at timing t3, the first-system storage apparatus 2 switches from the standby-system storage apparatus to the active-system storage apparatus and the second-system storage apparatus 3 switches from the active-system storage apparatus to the standby-system storage apparatus.

Note that, if a writing request is received during the data relocation, the storage system 1 stores writing data in the active-system storage apparatus and achieves synchronization of the active-system storage apparatus and the standby-system storage apparatus at desired timing according to data synchronization processing different from the data relocation. The storage system 1 excludes the writing data, for which the writing request is received during the data relocation, from relocation targets currently being subjected to the data relocation and performs the relocation at timing determined by a desired determination processing in the automated tiering.

In this way, the storage system 1 may achieve suppression of deterioration in the expected access performance due to the suspension of the data relocation. The storage system 1 may equalize the performance of the first-system storage apparatus 2 and the performance of the second-system storage apparatus 3.

Second Embodiment

Figure 2:
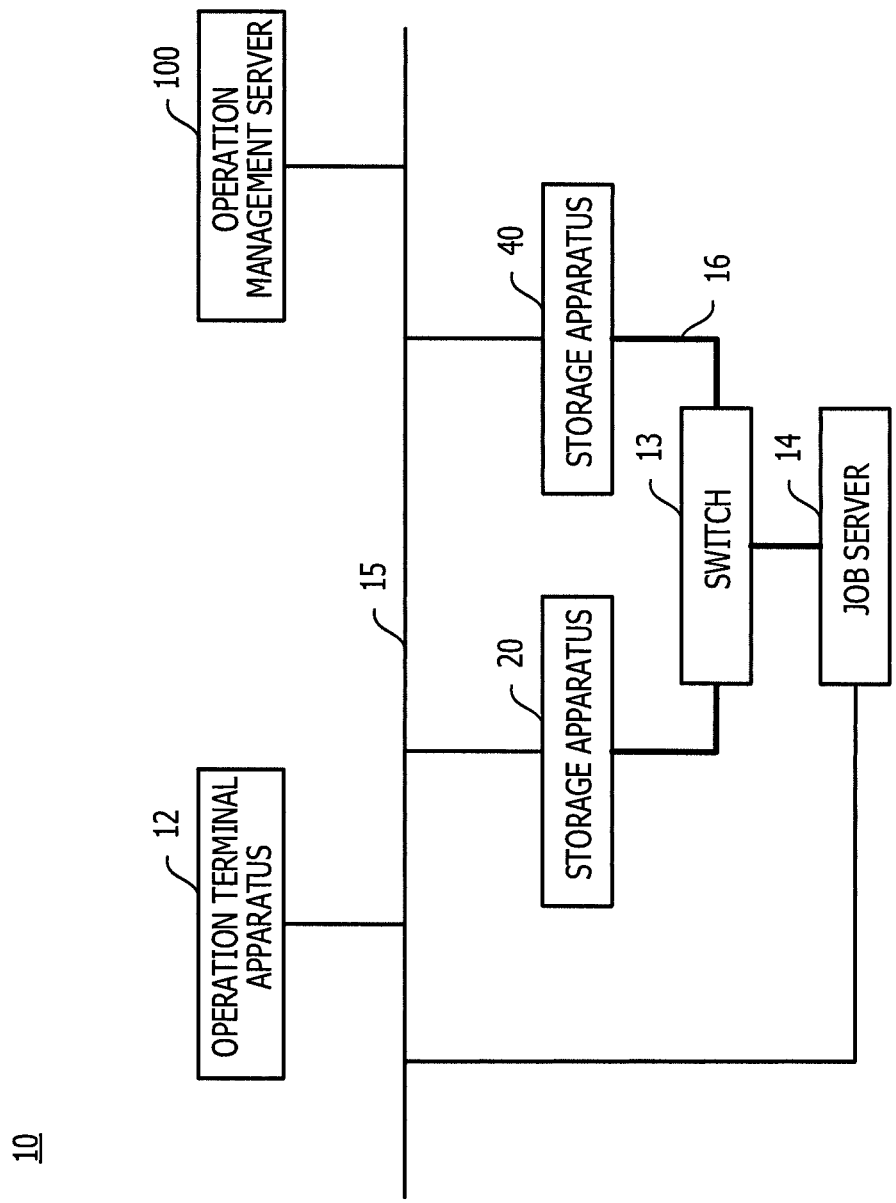
FIG. 2 is a diagram illustrating an example of the configuration of a storage system according to a second embodiment.

A storage system according to a second embodiment is explained with reference to FIG. 2. FIG. 2 is a diagram illustrating an example of the configuration of the storage system according to the second embodiment.

A storage system 10 has a cluster configuration including an operation terminal apparatus 12, a switch 13, a job server 14, a management local area network (LAN) 15, a storage area network (SAN) 16, storage apparatuses 20 and 40, and an operation management server 100. The management LAN 15 communicatively couples the operation terminal apparatus 12, the job server 14, the storage apparatuses 20 and 40, and the operation management server 100. The SAN 16 is a high-speed data transmission line for coupling the job server 14 and the storage apparatuses 20 and 40 via the switch 13 and is, for example, an fibre channel (FC) SAN.

The operation terminal apparatus 12 receives operation of an operator via a graphical user interface (GUI). The job server 14 writes data in the storage apparatuses 20 and 40 and reads out data stored in the storage apparatuses 20 and 40.

The storage apparatus 20 is a main-system storage apparatus (primary) and is an active-system storage apparatus (active) during normal operation. The storage apparatus 40 is a sub-system-storage apparatus (secondary) and is a standby-system storage apparatus (standby) during the normal operation. The storage apparatuses 20 and 40 maintain data equivalence in both the storage apparatuses 20 and 40. If a failure occurs in one of the storage apparatuses 20 and 40, the other continues a job.

The operation management server 100 functions as a storage management apparatus and performs operation management of the storage system 10. The operation management server 100 manages automated storage tiering and instructs the storage apparatuses 20 and 40 to perform data relocation.

Figure 3:
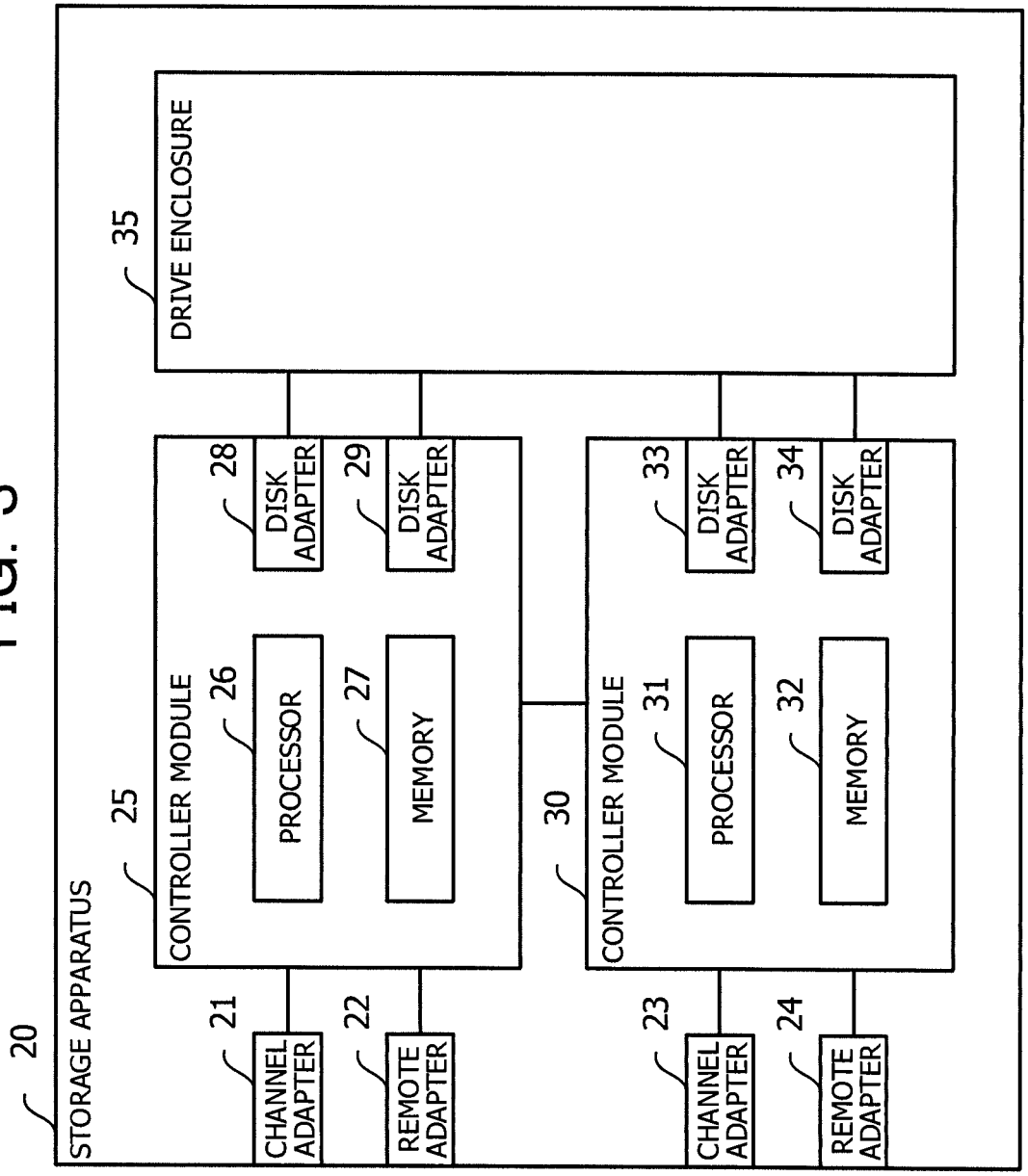
FIG. 3 is a diagram illustrating an example of the configuration of a storage apparatus according to the second embodiment.

The storage apparatuses 20 and 40 are explained with reference to FIG. 3. FIG. 3 is a diagram illustrating an example of the configuration of a storage apparatus according to the second embodiment. Note that, since the storage apparatus 20 and the storage apparatus 40 have the same configuration, the storage apparatus 20 is explained and explanation concerning the storage apparatus 40 is omitted.

The storage apparatus 20 includes channel adapters 21 and 23, remote adapters 22 and 24, controller modules (CMs) 25 and 30, and a drive enclosure (DE) 35.

The storage apparatus 20 is coupled to the job server 14 via the channel adapters 21 and 23. The channel adapter 21 is provided to correspond to the CM 25. The channel adapter 23 is provided to correspond to the CM 30. The storage apparatus 20 may be coupled to other storage apparatuses via the remote adapters 22 and 24. The remote adapter 22 is provided to correspond to the CM 25. The remote adapter 24 is provided to correspond to the CM 30.

The DE 35 includes a plurality of kinds of storage devices (for example, a hard disk drive (HDD) such as a near line disk or an online disk, a SSD, and a tape storage).

The CM 25 and the CM 30 may be coupled to each other to share a load. Note that the storage apparatus 20 includes the two CMs 25 and 30. However, the storage apparatus 20 is not limited to this and may include one of the CM 25 and the CM 30, may include three or more CMs, or may include, for example, four or eight CMs.

The CM 25 includes a processor 26, a memory 27, disk adapters 28 and 29. The CM 30 includes a processor 31, a memory 32, and disk adapters 33 and 34. Note that, since the CM 30 has a configuration same as the configuration of the CM 25, in the following explanation, explanation of the CM 25 is substituted for explanation of the CM 30.

The processor 26, the memory 27, and the disk adapters 28 and 29 are coupled via a not-illustrated bus. The processor 26 controls the entire CM 25 and performs data relocation in automated storage tiering. Note that the processor 26 may be a multi-processor. The processor 26 is, for example, a central processing unit (CPU), a micro processing unit (MPU), a digital signal processor (DSP), an application specific integrated circuit (ASIC), or a programmable logic device (PLD). The processor 26 may be a combination of two or more elements among the CPU, the MPU, the DSP, the ASIC, and the PLD.

The memory 27 stores data when the data is read out from the storage device. Besides, the memory 27 functions as a buffer when data is written in the storage device. The memory 27 stores user data and control information.

For example, the memory 27 includes a random access memory (RAM) and a nonvolatile memory. The RAM is used as a main storage of the CM 25. In the RAM, a program of an operating system (OS), firmware, and at least a part of application programs that the processor 26 is caused to execute are temporarily stored. In the RAM, various data desired for processing by the processor 26 are stored. The RAM may include a cache memory separately from a memory used for storage of various data.

The nonvolatile memory retains stored content even during interruption of a power supply of the storage apparatus 20. The nonvolatile memory is, for example, a semiconductor storage such as an electrically erasable programmable read only memory (EEPROM) or a flash memory or a HDD. The nonvolatile memory is used as an auxiliary storage of the CM 25. In the nonvolatile memory, a program of an operating system, firmware, application programs, and various data are stored.

As peripheral devices coupled to the bus, there are an input/output interface and a communication interface. The input/output interface is coupled to an input/output device to perform input and output. The input/output interface transmits, to the processor 26 and the memory 27, signals and data sent from a storage device such as a HDD. The input/output interface outputs, for example, a signal received from the processor 26 to other control units and an output device coupled to the CM 25. The communication interface performs transmission and reception of data between the communication interface and the other CM (the CM 30) in the storage apparatus 20.

The disk adapters 28 and 29 perform interface control (access control) to a storage device.

With the hardware configuration explained above, a processing function of the storage apparatus 20 or the CMs 25 and 30 may be realized. Note that the first-system storage apparatus 2 and the second-system storage apparatus 3 explained in the first embodiment may also be realized by hardware same as the storage apparatus 20 or the CMs 25 and 30.

Figure 4:
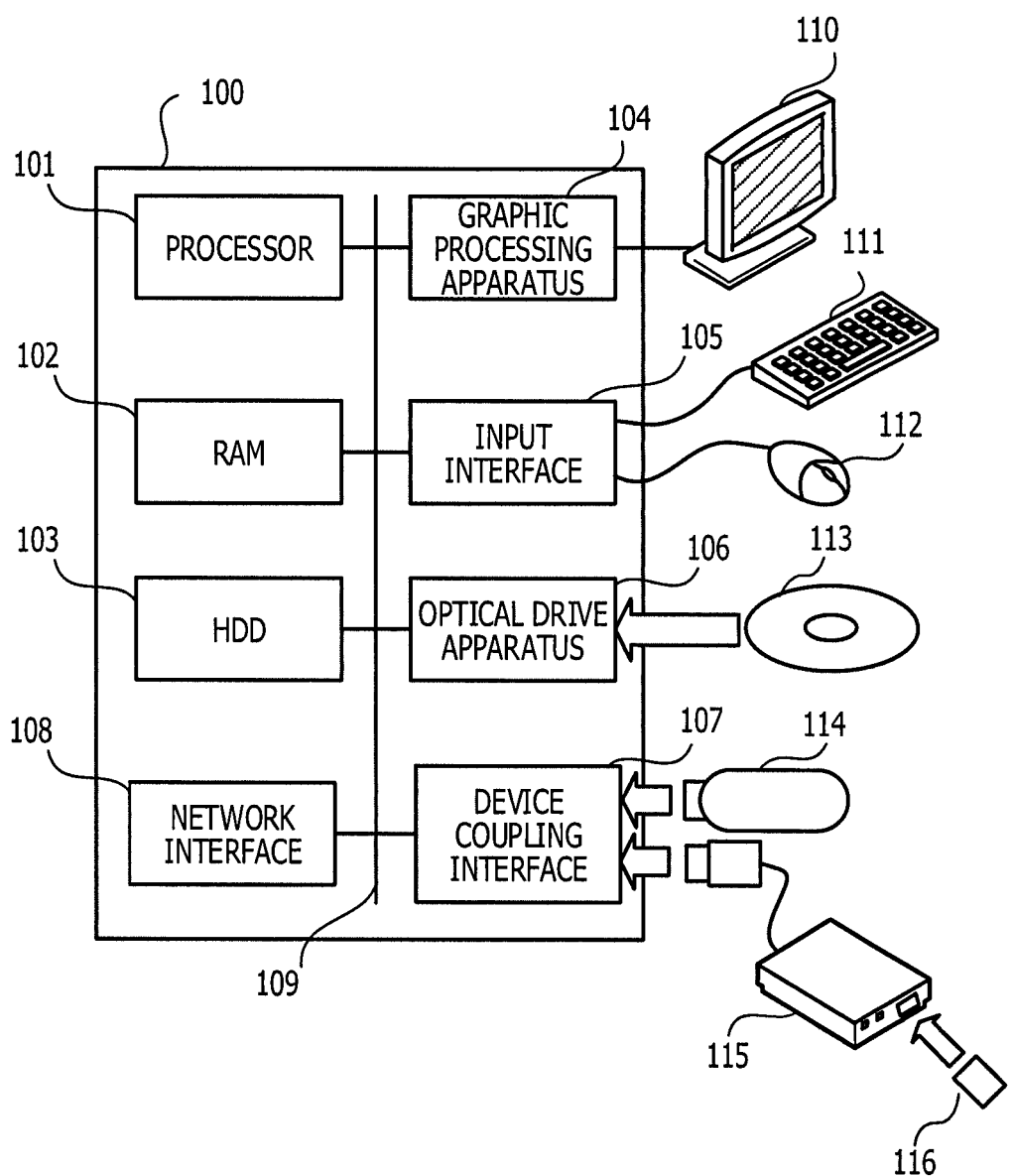
FIG. 4 is a diagram illustrating an example of a hardware configuration of an operation management server according to the second embodiment.

A hardware configuration of the operation management server 100 is explained with reference to FIG. 4. FIG. 4 is a diagram illustrating an example of the hardware configuration of the operation management server according to the second embodiment.

The entire operation management server 100 is controlled by a processor 101. That is, the processor 101 functions as a control unit of the operation management server 100. A RAM 102 and a plurality of peripheral devices are coupled to the processor 101 via a bus 109. The processor 101 may be a multi-processor. The processor 101 is, for example, a CPU, an MPU, a DSP, an ASIC, or a PLD. The processor 101 may be a combination of two or more elements among the CPU, the MPU, the DSP, the ASIC, and the PLD.

The RAM 102 is used as a main storage of the operation management sever 100. In the RAM 102, a program of an OS and at least a part of application programs that the processor 101 is caused to execute are temporarily stored. In the RAM 102, various data desired for processing by the processor 101 are stored.

As peripheral devices coupled to the bus 109, there are a HDD 103, a graphic processing apparatus 104, an input interface 105, an optical drive apparatus 106, a device coupling interface 107, and a network interface 108.

The HDD 103 magnetically writes data in and reads out data from a disk incorporated in the HDD 103. The HDD 103 is used as an auxiliary storage of the operation management server 100. In the HDD 103, a program of an OS, application programs, and various data are stored. Note that, as the auxiliary storage, a semiconductor storage such as a flash memory may also be used.

A monitor 110 is coupled to the graphic processing apparatus 104. The graphic processing apparatus 104 causes, according to a command from the processor 101, the monitor 110 to display an image on a screen of the monitor 110. As the monitor 110, there are a display apparatus and a liquid crystal display apparatus in which a cathode ray tube (CRT) is used. The monitor 110 functions as a display apparatus that displays states of the storage apparatuses 20 and 40.

A keyboard 111 and a mouse 112 are coupled to the input interface 105. The input interface 105 transmits, to the processor 101, signals sent from the keyboard 111 and the mouse 112. Note that the mouse 112 is an example of a pointing device. Other pointing devices may also be used. As the other pointing devices, there are a touch panel, a tablet, a touch pad, a track ball, and the like.

The optical drive apparatus 106 performs reading of data recorded in an optical disk 113 using a laser beam or the like. The optical disk 113 is a portable recording medium in which data is recorded to be readable by reflection of light. As the optical disk 113, there are a digital versatile disc (DVD), a DVD-RAM, a compact disc rom (CD-ROM), a CD-R (Recordable)/RW (ReWritable), and the like.

The device coupling interface 107 is a communication interface for coupling a peripheral device to the operation management server 100. For example, a memory device 114 and a memory reader/writer 115 may be coupled to the device coupling interface 107. The memory device 114 is a recording medium mounted with a communication function with the device coupling interface 107. The memory reader/writer 115 is an apparatus that performs writing of data in a memory card 116 and readout of data from the memory card 116. The memory card 116 is a recording medium of a card type.

The network interface 108 is coupled to the management LAN 15. The network interface 108 performs transmission and reception of data between the network interface 108 and other computers (for example, the operation terminal apparatus 12 and the job server 14) including the storage apparatuses 20 and 40 or a communication device via the management LAN 15.

With the hardware configuration explained above, it is possible to realize a processing function in the second embodiment. For example, the processor 101 executes respective predetermined programs, whereby the operation management server 100 may perform storage management and automated storage tiering. Note that the operation terminal apparatus 12 and the job server 14 and the storage management apparatus 4 explained in the first embodiment may also be realized by hardware same as the operation management server 100 illustrated in FIG. 4.

The operation management server 100 realizes the processing function in the second embodiment by, for example, executing a computer program recorded in a computer-readable recording medium. Computer programs describing processing contents that the operation management server 100 is caused to execute may be recorded in various recording media. For example, computer programs that the operation management server 100 is caused to execute may be stored in the HDD 103. The processor 101 loads at least a part of the computer programs in the HDD 103 to the RAM 102 and executes the computer program. The computer programs that the operation management server 100 is caused to execute may also be recorded in portable recording media such as the optical disk 113, the memory device 114, and the memory card 116. The computer programs stored in the portable recording media may be executed after being installed in the HDD 103 according to, for example, the control from the processor 101. The processor 101 may also directly read out the computer programs from the portable recording media and executes the computer programs.

Figure 5:
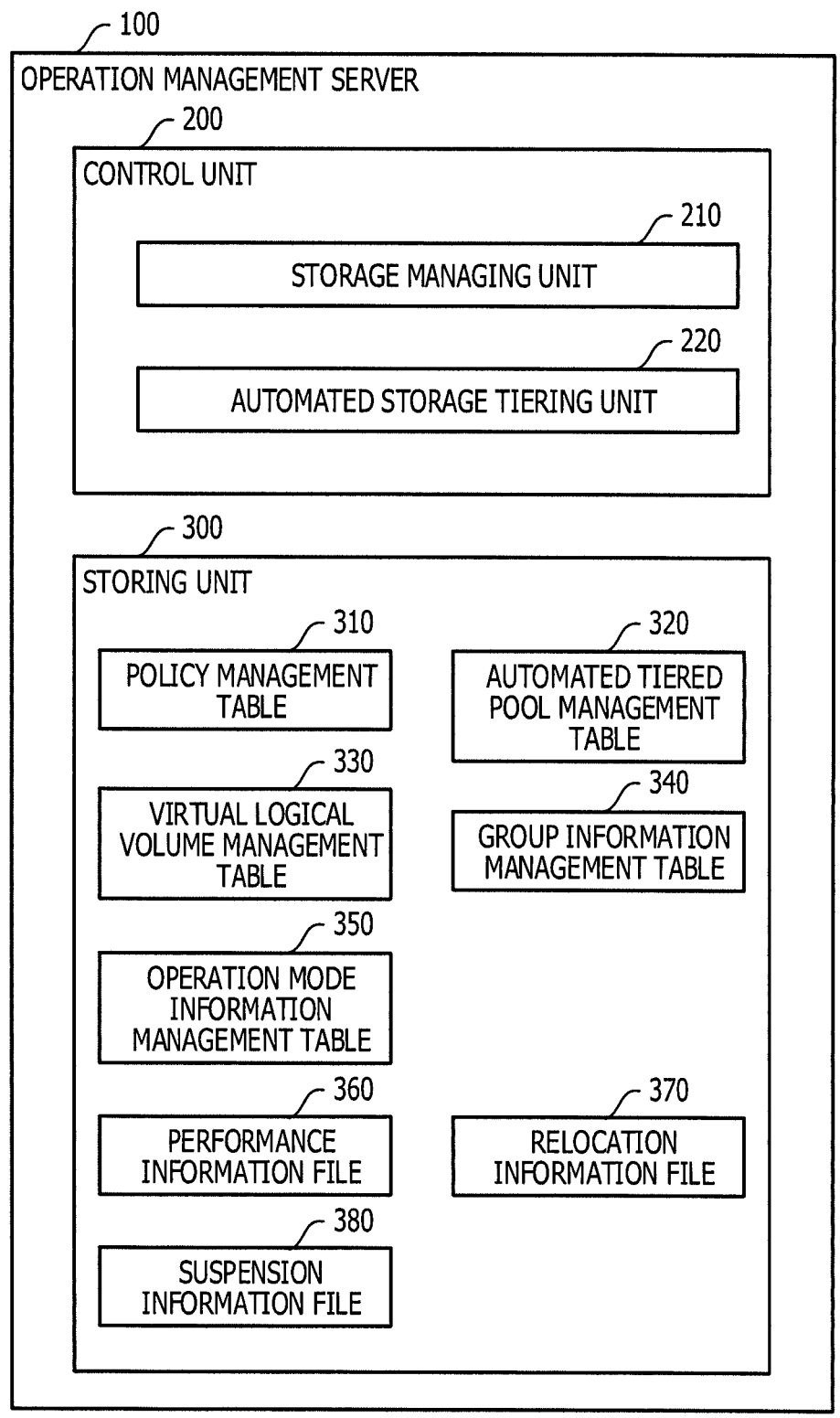
FIG. 5 is a diagram illustrating an example of a functional configuration of the operation management server according to the second embodiment.

A functional configuration of the operation management server 100 is explained with reference to FIG. 5. FIG. 5 is a diagram illustrating an example of the functional configuration of the operation management server according to the second embodiment.

The operation management server 100 includes a control unit 200 and a storing unit 300. The control unit 200 includes a storage managing unit 210 and an automated storage tiering unit 220. The storage managing unit 210 performs storage management. The processor 101 executes a storage management program, whereby the operation management server 100 realizes the storage managing unit 210. The automated storage tiering unit 220 performs automated storage tiering. The processor 101 executes an automated storage tiering program, whereby the operation management server 100 realizes the automated storage tiering unit 220.

The storing unit 300 stores a policy management table 310, an automated tiered pool management table 320, a virtual logical volume management table 330, a group information management table 340, and an operation mode information management table 350. Further, the storing unit 300 stores a performance information file 360, a relocation information file 370, and a suspension information file 380. The storing unit 300 is realized by the HDD 103 and the RAM 102.

The policy management table 310 retains a hierarchical policy (hereinafter simply referred to as policy), which is a condition for executing the automated storage tiering. The storage managing unit 210 receives a policy creation instruction from the operation terminal apparatus 12, creates the policy management table 310, and stores the policy management table 310 in the storing unit 300.

The automated tiered pool management table 320 retains a policy applied to an automated tiered pool, which is a management target, and a sub-pool configuration. The storage managing unit 210 receives an automated tiered pool creation instruction from the operation terminal apparatus 12 and instructs the automated storage tiering unit 220 to create an automated tiered pool. The automated storage tiering unit 220 receives the automated tiered pool creation instruction, requests the main-system storage apparatus (the storage apparatus 20) to create an automated tiered pool, and notifies the storage managing unit 210 of a creation result response received from the main-system storage apparatus. The storage managing unit 210 creates the automated tiered pool management table 320 based on the automated tiered pool creation instruction and the creation result response and stores the automated tiered pool management table 320 in the storing unit 300.

The virtual logical volume management table 330 retains information on storage resources allocated to a virtual logical volume, which is a management target. The storage managing unit 210 receives a virtual logical volume creation instruction from the operation terminal apparatus 12, refers to the automated tiered pool management table 320, and acquires information on an automated tiered pool for allocating storage resources to the virtual logical volume. The storage managing unit 210 notifies the automated storage tiering unit 220 of the virtual logical volume creation instruction and the information on the automated tiered pool. The automated storage tiering unit 220 receives the virtual logical volume creation instruction, requests the main-system storage apparatus (the storage apparatus 20) to create a virtual logical volume, and notifies the storage managing unit 210 of a creation result response received from the main-system storage apparatus. The storage managing unit 210 creates the virtual logical volume management table 330 based on the virtual logical volume creation instruction and the creation result response and stores the virtual logical volume management table 330 in the storing unit 300. Note that the storage managing unit 210 returns a response to the virtual logical volume creation instruction to the operation terminal apparatus 12, whereby the operation terminal apparatus 12 may display a creation result of the virtual logical volume.

The group information management table 340 retains a correspondence relation between a main-system storage apparatus and a sub-system-storage apparatus forming a pair for failover and a correspondence relation of a group that is an operation unit of the failover. The operation mode information management table 350 retains an operation state of the group.

The storage managing unit 210 receives a group creation instruction from the operation terminal apparatus 12 and instructs the main-system storage apparatus and the sub-system-storage apparatus to pair a port of the main-system storage apparatus and a port of the sub-system-storage apparatus. The main-system storage apparatus and the sub-system-storage apparatus respectively create group information and respond to the storage managing unit 210. The storage managing unit 210 creates the group information management table 340 and the operation mode information management table 350 based on the group information notified from the main-system storage apparatus and the group information notified from the sub-system-storage apparatus and stores the group information management table 340 and the operation mode information management table 350 in the storing unit 300. Note that the storage managing unit 210 returns the response to the group creation instruction to the operation terminal apparatus 12, whereby the operation terminal apparatus 12 may display a group creation result.

The policy management table 310 is explained with reference to FIG. 6. FIG. 6 is a diagram illustrating an example of the policy management table according to the second embodiment.

The policy management table 310 records, for each of policies, a condition for executing the automated storage tiering. The policy management table 310 includes, as items, a policy name, an evaluation standard, an evaluation period, and a relocation limit time. The policy name indicates information capable of specifying a policy. The policies specify, according to the evaluation period and the evaluation standard, an evaluation method for access modes of blocks serving as allocation units of storage resources and specify, as the relocation limit time, a time that may be consumed for relocation based on an evaluation result. In the following explanation, the blocks serving as the allocation units of the storage resources are referred to as flexible tier pool elements (FTRPEs).

The evaluation standard is a standard of the access mode of each of the FTRPEs. For example, there are a peak and an average of the evaluation standard. The evaluation standard "peak" indicates a maximum of I/O per second (IOPS) in the evaluation period. The evaluation standard "average" indicates an average of IOPSs in the evaluation period. The evaluation period is a period serving as a collection period and an evaluation target of the access mode of each of the FTRPEs. The relocation limit time is one of suspension conditions for the data relocation in the active-system storage apparatus. The relocation limit time indicates a time in which the active-system storage apparatus may perform the data relocation without suspension.

Note that the suspension condition may be detection of a load (for example, the IOPS (the peak or the average)) exceeding a threshold of the storage system 10, the storage apparatus 20, the storage apparatus 40, the SAN 16, or the like.

For example, a policy #01 indicates that the access mode of the FTRPE is evaluated at a maximum IOPS in the evaluation period of seven days and indicates that the data relocation is suspended if the active-system storage apparatus does not complete the data relocation based on evaluation within twenty-four hours.

The automated tiered pool management table 320 is explained with reference to FIG. 7. FIG. 7 is a diagram illustrating an example of the automated tiered pool management table according to the second embodiment.

The automated tiered pool management table 320 records a policy and a sub-pool configuration applied to each of automated tiered pools. The automated tiered pool management table 320 includes, as items, an automated tiered pool name, an applied policy, a sub-pool (low-speed), a sub-pool (medium-speed), and a sub-pool (high-speed). The automated tiered pool name indicates information capable of specifying the automated tiered pools. The automated tiered pools specify policies applied to the automated tiered pools and specify sub-pools configuring the automated tiered pools.

The automated tiered pool is configured by a plurality of sub-pools of different storage types. The sub-pool (low-speed) indicates information capable of specifying a storage resource of a storage type having relatively low access speed and low cost. The sub-pool (high-speed) indicates information capable of specifying a storage resource of a storage type having relatively high access speed and high cost. The sub-pool (medium-speed) indicates information capable of specifying a storage resource of a storage type having an intermediate characteristic between the sub-pool (low-speed) and the sub-pool (high-speed) in terms of performance and in terms of cost.

For example, a pool #01 is an automated tiered pool to which the policy #01 is applied. The pool #01 indicates that allocation of a sub-pool #01_L, a sub-pool #01_M, and a sub-pool #01_H is received.

The virtual logical volume management table 330 is explained with reference to FIG. 8. FIG. 8 is a diagram illustrating an example of the virtual logical volume management table according to the second embodiment.

The virtual logical volume management table 330 records an automated tiered pool for allocating a storage resource to a virtual logical volume and an allocation ratio of a storage resource for each of storage types. The virtual logical volume management table 330 includes, as items, a virtual logical volume name, an automated tiered pool name, a low-speed allocation ratio, a medium-speed allocation ratio, and a high-speed allocation ratio. The virtual logical volume name indicates information capable of specifying a virtual logical volume. The low-speed allocation ratio indicates an allocation ratio of a storage resource allocated from the sub-pool (low-speed) in the virtual logical volume. The medium-speed allocation ratio indicates an allocation ratio of a storage resource allocated from the sub-pool (medium-speed) in the virtual logical volume. The high-speed allocation ratio indicates an allocation ratio of a storage resource allocated from the sub-pool (high-speed) in the virtual logical volume.

For example, a flexible tier volume (FTV) #01 indicates that storage resources are allocated at a ratio of 10% from the sub-pool (low-speed), 10% from the sub-pool (medium-speed), and 80% from the sub-pool (high-speed) in the pool #01. That is, the FTV #01 receives allocation of storage resources at a ratio of 10% from a sub-pool #01_L, 10% from the sub-pool #01_M, and 80% from the sub-pool #01_H.

The group information management table 340 is explained with reference to FIG. 9. FIG. 9 is a diagram illustrating an example of the group information management table according to the second embodiment.

The group information management table 340 records the paired port of the main-system storage apparatus and port of the sub-system-storage apparatus. The group information management table 340 includes, as major items, the main-system storage apparatus and the sub-system-storage apparatus. The major items include, as minor items, a group name, a serial number, and a port name. The group name indicates information capable of specifying a group. Note that one group includes one or more ports (channel adapter (CA) ports set in channel adapters). The serial number indicates information capable of specifying a storage apparatus. The port name indicates information capable of specifying a port.

For example, in the group #1, a storage apparatus specified by a serial number #1111 is the main-system storage apparatus. The group #1 includes a port #0 and a port #1 of the storage apparatus specified by the serial number #1111. In the group #2, a storage apparatus specified by the serial number #2222 is the sub-system-storage apparatus. The group #2 includes a port #0 and a port #1 of the storage apparatus specified by the serial number #2222.

The operation mode information management table 350 is explained with reference to FIG. 10. FIG. 10 is a diagram illustrating an example of the operation mode information management table according to the second embodiment.

The operation mode information management table 350 records an operation mode of the paired port of the main-system storage apparatus and port of the sub-system-storage apparatus. The operation mode information management table 350 includes, as items, a serial number, a group name, and a status. The status indicates information capable of distinguishing whether a storage apparatus is the active-system storage apparatus or the standby-system storage apparatus.

For example, the storage apparatus specified by the serial number #1111 is the active-system storage apparatus because the storage apparatus has a status "active" for the group #1. The storage apparatus specified by the serial number #2222 is the standby-system storage apparatus because the storage apparatus has a status "standby" for the group #2.

Figure 11:
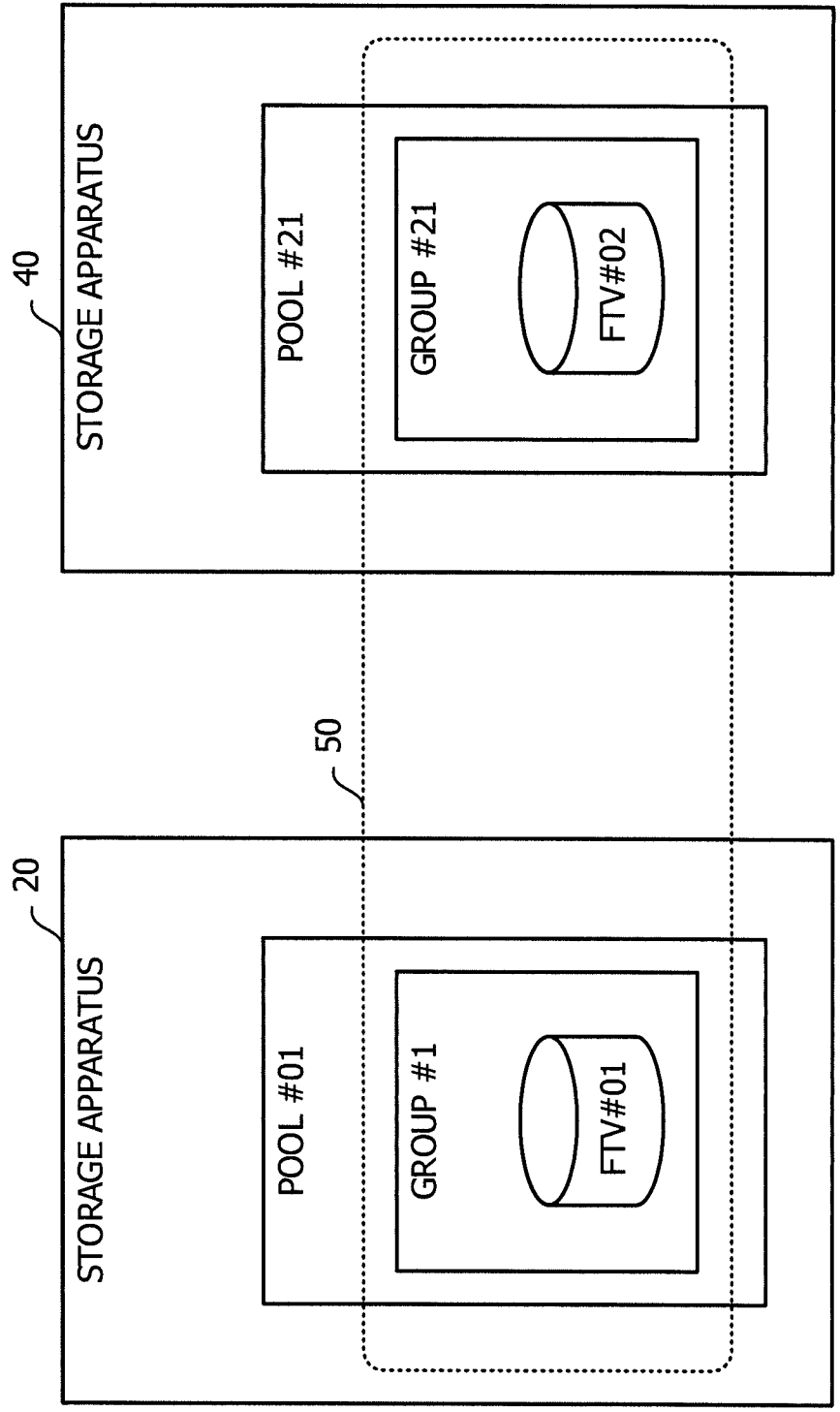
FIG. 11 is a diagram illustrating an example of paired groups according to the second embodiment.

Paired groups and a virtual logical volume corresponding to the group are explained with reference to FIG. 11. FIG. 11 is a diagram illustrating an example of the paired groups according to the second embodiment.

A pair 50 is a pair of the group #1 belonging to the storage apparatus 20 functioning as the main-system storage apparatus and the group #2 belonging to the storage apparatus 40 functioning as the sub-system-storage apparatus. The FTV #01 is a virtual logical volume that receives allocation of a storage resource from the pool #01 and is created to correspond to the group #1. The FTV #02 is a virtual logical volume that receives allocation of a storage resource from a pool #21. The FTV #02 is created to correspond to the group #2. The FTV #01 and the FTV #02 maintain data equivalence in both of the FTV #01 and the FTV #02 in synchronization with each other.

Figure 12:
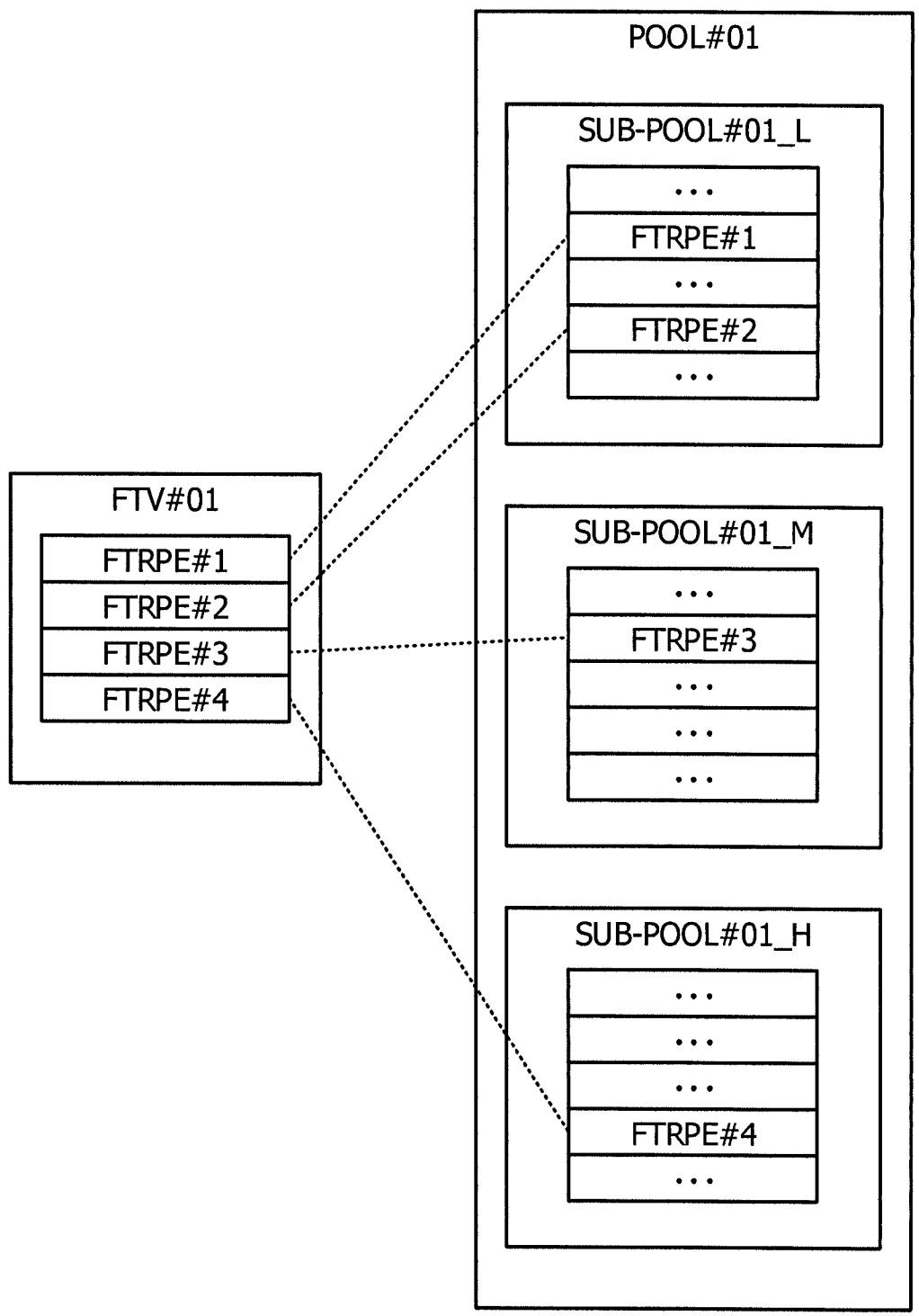
FIG. 12 is a diagram illustrating an example of a virtual logical volume before data relocation according to the second embodiment.
Figure 13:
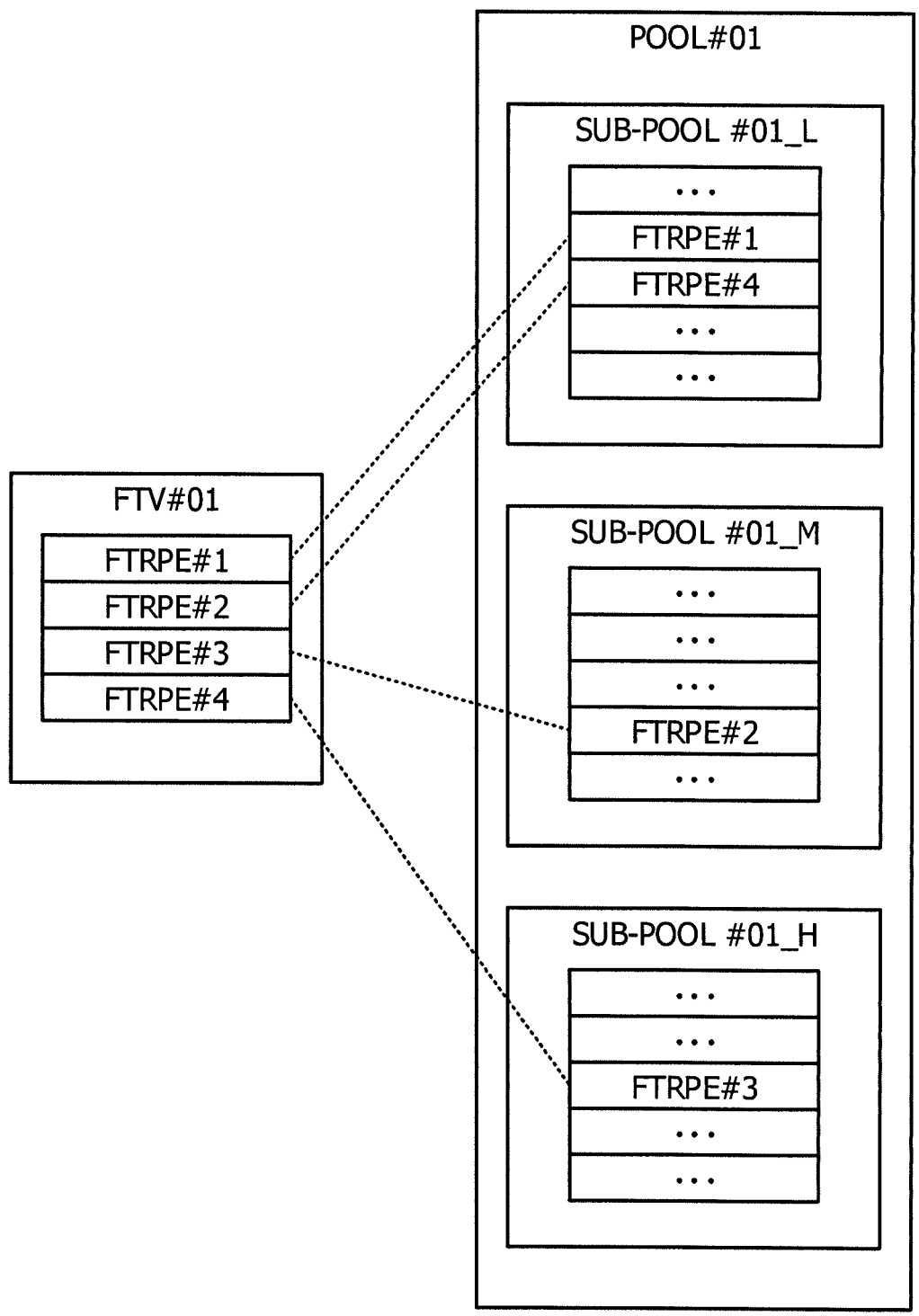
FIG. 13 is a diagram illustrating an example of a virtual logical volume after the data relocation according to the second embodiment.

The data relocation of the virtual logical volume is explained with reference to FIGS. 12 and 13. The locations of FTRPEs before the data relocation are explained with reference to FIG. 12. FIG. 12 is a diagram illustrating an example of the virtual logical volume before the data relocation according to the second embodiment.

The FTV #01 and the FTV #02 maintain data equivalence in synchronization with each other. Therefore, the FTV #01 is explained and the FTV #02 is omitted from explanation. The FTV #01 includes an FTRPE #1, an FTRPE #2, an FTRPE #3, and an FTRPE #4. The FTRPE #1 and the FTRPE #2 receive allocation of storage resources from the sub-pool #01_L in the pool #01. The FTRPE #3 receives allocation of a storage resource from the sub-pool #01_M in the pool #01. The FTRPE #4 receives allocation of a storage resource from the sub-pool #01_H in the pool #01. The FTV #01 exhibits expected performance when higher-speed responses are requested in the order of the FTRPE #4, the FTRPE #3, the FTRPE #2, and the FTRPE #1 or the FTRPE #4, the FTRPE #3, the FTRPE #1, and FTRPE #2.

An access mode (an access situation) of the FTV #01 is collected in an evaluation period. For example, when high-speed responses are requested in the order of the FTRPE #3, the FTRPE #2, the FTRPE #4, and the FTRPE #1 from the collected access mode, the FTRPE of the FTV #01 is a relocation target.

The storage system 10 may achieve optimization of access performance and data storage cost by performing the data relocation according to an access mode of each of the FTRPEs of the FTV #01. Note that the data storage cost is a mode of cost in a broad sense for maintenance of storage resources. The data storage cost may include extension cost and the like during capacity shortage.

The locations of the FTRPEs after the data relocation are explained with reference to FIG. 13. FIG. 13 is a diagram illustrating an example of the virtual logical volume after the data relocation according to the second embodiment.

The FTRPE #1 and the FTRPE #4 receive reallocation of storage resources from the sub-pool #01_L in the pool #01. The FTRPE #2 receives reallocation of a storage resource from the sub-pool #01_M in the pool #01.

The FTRPE #3 receives reallocation of a storage resource from the sub-pool #01_H in the pool #01. Consequently, the FTV #01 exhibits expected performance when high-speed responses are requested in the order of the FTRPE #3, the FTRPE #2, the FTRPE #1, and the FTRPE #4 or the FTRPE #3, the FTRPE #2, the FTRPE #4, and FTRPE #1.

Figure 14:
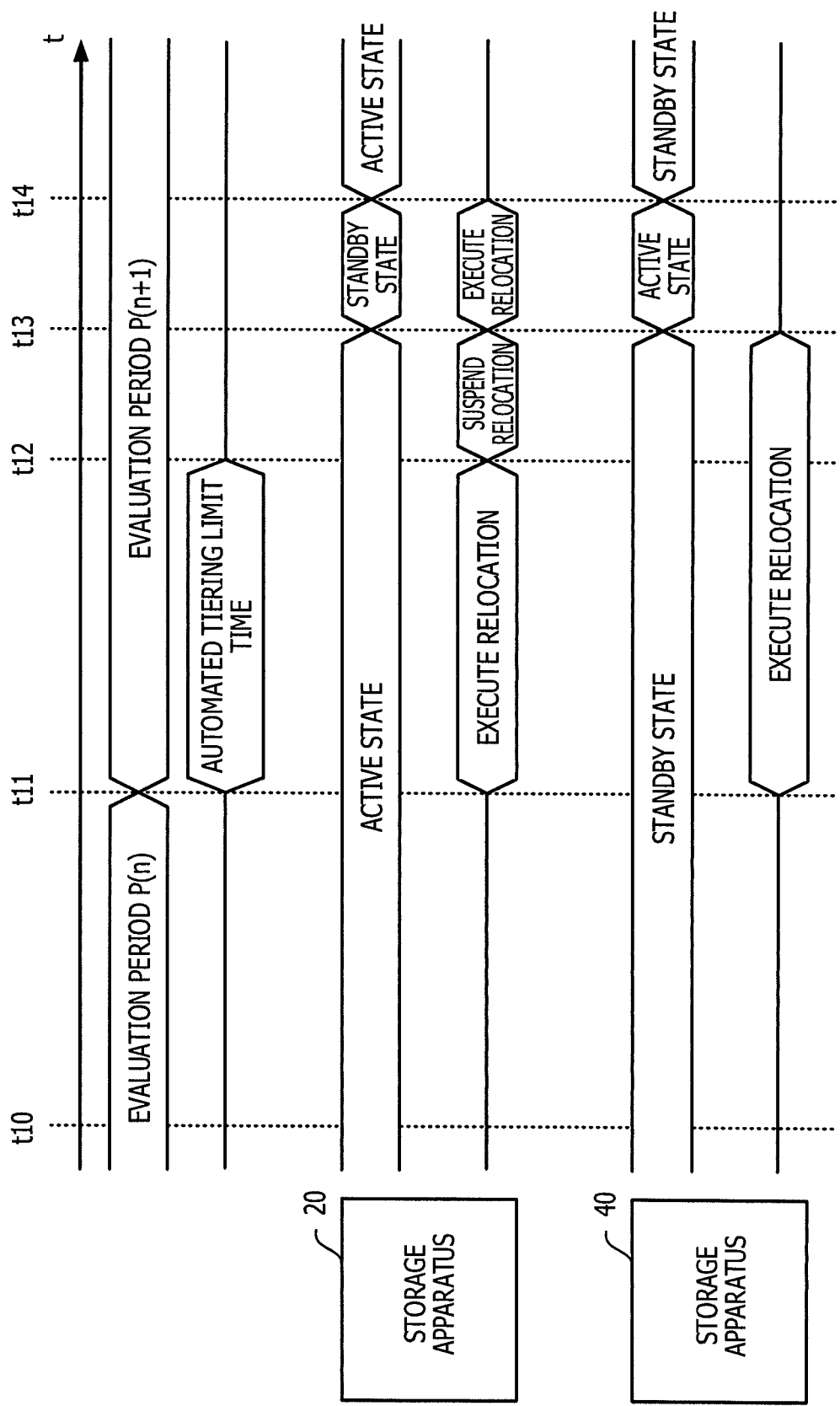
FIG. 14 is a diagram illustrating an example of a timing chart during automated storage tiering according to the second embodiment.

However, since the relocation limit time is set, the active-system storage apparatus sometimes suspends the data relocation. Suspension of the data relocation during the automated storage tiering is explained with reference to FIG. 14. FIG. 14 is a diagram illustrating an example of a timing chart during the automated storage tiering according to the second embodiment.

[Timing t10] The storage apparatus 20 is the main-system storage apparatus and is in an active state (a status "active"). The storage apparatus 40 is the sub-system-storage apparatus and is in a standby state (a status "standby"). The storage apparatus 20 records an IOPS of an evaluation period P(n). Both the storage apparatuses 20 and 40 are not executing the data relocation.

[Timing t11] The storage apparatus 20 ends the recording to the IOPS in the evaluation period P(n) and notifies the operation management server 100 of the IOPS in the evaluation period P(n). The operation management server 100 determines, based on the notification of the IOPS in the evaluation period P(n), the FTRPEs set as targets of the data relocation according to the policy and instructs the storage apparatuses 20 and 40 to start the data relocation. The operation management server 100 sets a relocation limit time according to the start of the data relocation. The storage apparatuses 20 and 40 start the data relocation. The storage apparatus 20 starts recording of an IOPS in an evaluation period P(n+1) following the evaluation period P(n). Note that the storage apparatus 20 may provide an interval time between the evaluation period P(n) and the evaluation period P(n+1) without incessantly starting the evaluation period P(n+1) from the end of the evaluation period P(n).

[Timing t12] The operation management server 100 instructs the storage apparatus 20 to suspend the data relocation according to the elapse of the relocation limit time. The storage apparatus 20 suspends the data relocation according to the suspension instruction. At this point, the storage apparatus 40 continues the data relocation. Since the data relocation is suspended, the storage apparatus 20 may respond to an access from the job server 14 without a load related to the data relocation. Therefore, the storage system 10 may proceed with the data relocation in the storage apparatus 40 while suppressing access performance deterioration using the storage apparatus 20 that suspends the data relocation.

[Timing t13] The storage apparatus 40 completes the data relocation. In response to the completion of the data relocation by the storage apparatus 40, the operation management server 100 instructs the storage apparatus 40 to perform failover. The storage apparatus 20 and the storage apparatus 40 interchange the active state and the standby state in synchronization with each other. That is, the storage apparatus 20 changes to the standby state and the storage apparatus 40 changes to the active state. The storage apparatus 20 resumes execution of the data relocation in the standby state.

Therefore, the storage system 10 realizes, with the storage apparatus 40, expected access performance by the completion of the data relocation. On the other hand, the storage system 10 may proceed with the data relocation in the storage apparatus 20. Since the storage apparatus 20 executes the data relocation in the standby state, the storage system 10 may complete the data relocation according to a data relocation process.

[Timing t14] The storage apparatus 20 completes the data relocation. In response to the completion of the data relocation by the storage apparatus 20, the operation management server 100 instructs the storage apparatus 20 to perform failback. The storage apparatus 20 and the storage apparatus 40 interchange the active state and the standby state in synchronization with each other. That is, the storage apparatus 20 changes to the active state and the storage apparatus 40 changes to the standby state.

Therefore, although a data relocation execution period until both of the storage apparatus 20 and the storage apparatus 40 complete the data relocation is sometimes long, the storage system 10 may suppress access performance deterioration during the data relocation execution period. That is, the storage system 10 may reduce an opportunity in which the data relocation is not completed because of suspension of the data relocation and expected access performance in the automated tiering may not be able to be exhibited.

At a point in time when the data relocation is completed in one of the storage apparatus 20 and the storage apparatus 40, the storage system 10 may realize expected access performance by the completion of the data relocation.

In this way, the storage system 10 may increase an opportunity of the completion of the data relocation even if the data relocation is suspended. The storage system 10 may realize expected access performance while responding to an access from the job server 14.

Figure 15:
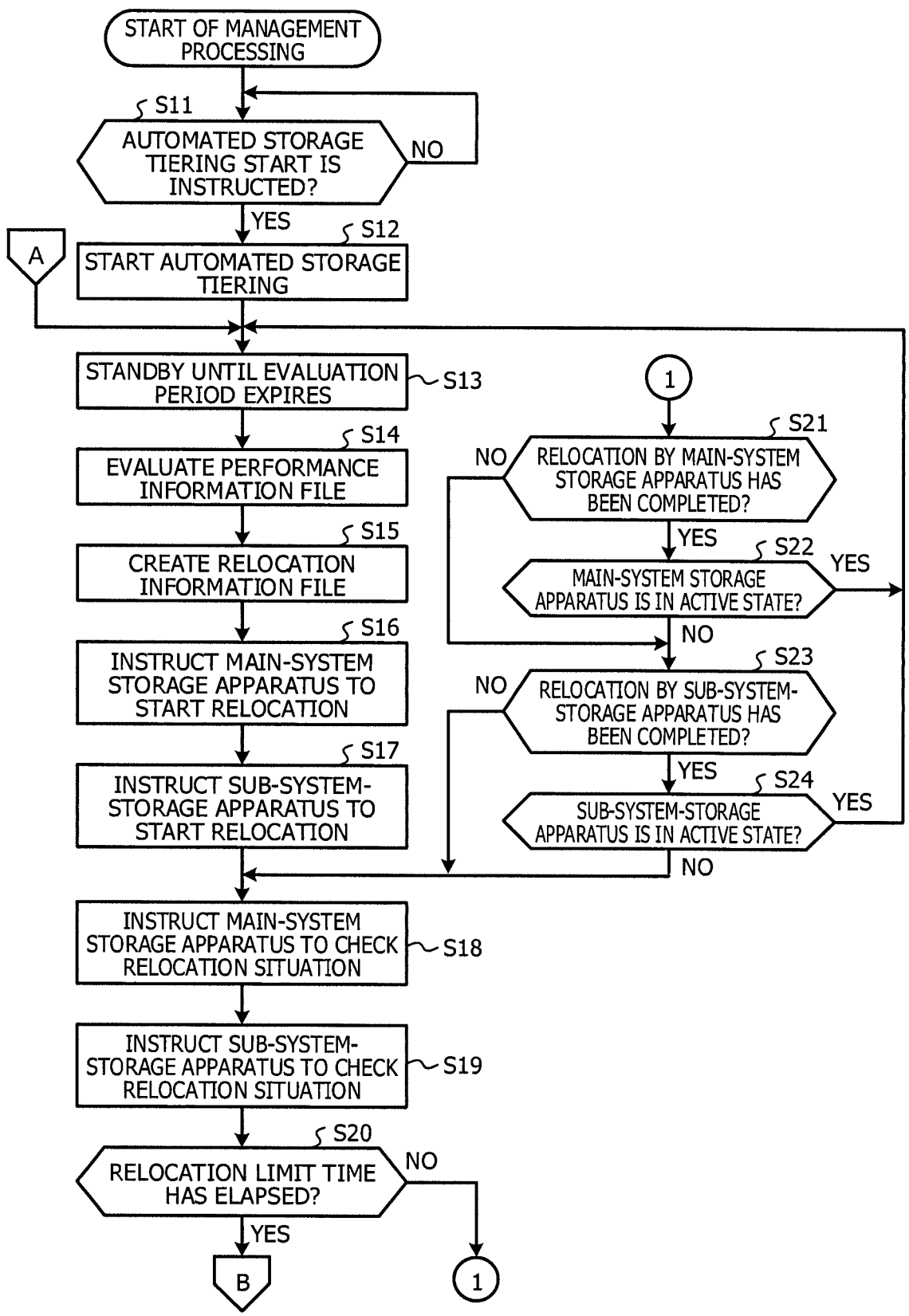
FIG. 15 is a diagram (No. 1) illustrating a flowchart of management processing according to the second embodiment.
Figure 16:
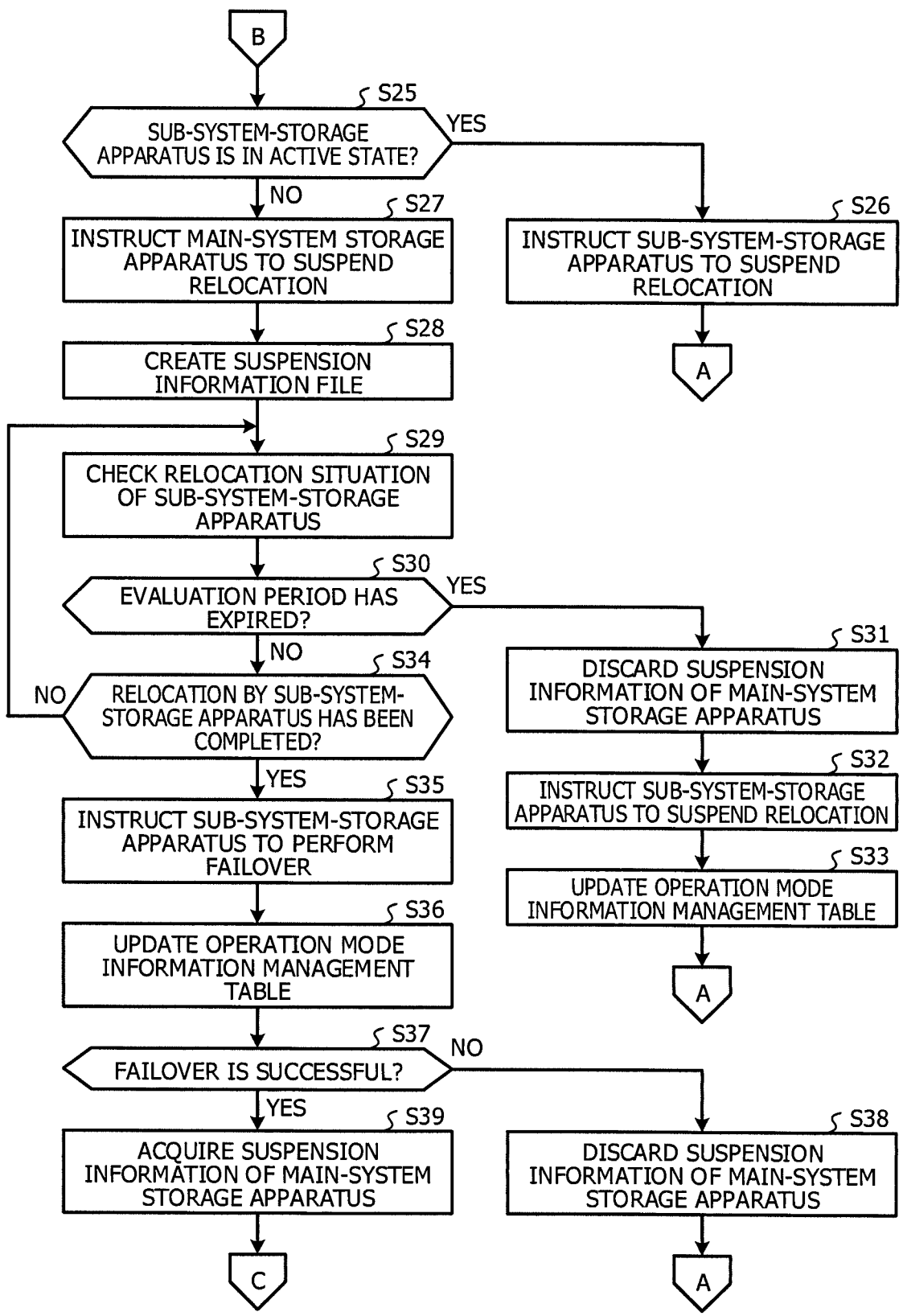
FIG. 16 is a diagram (No. 2) illustrating the flowchart of the management processing according to the second embodiment.
Figure 17:
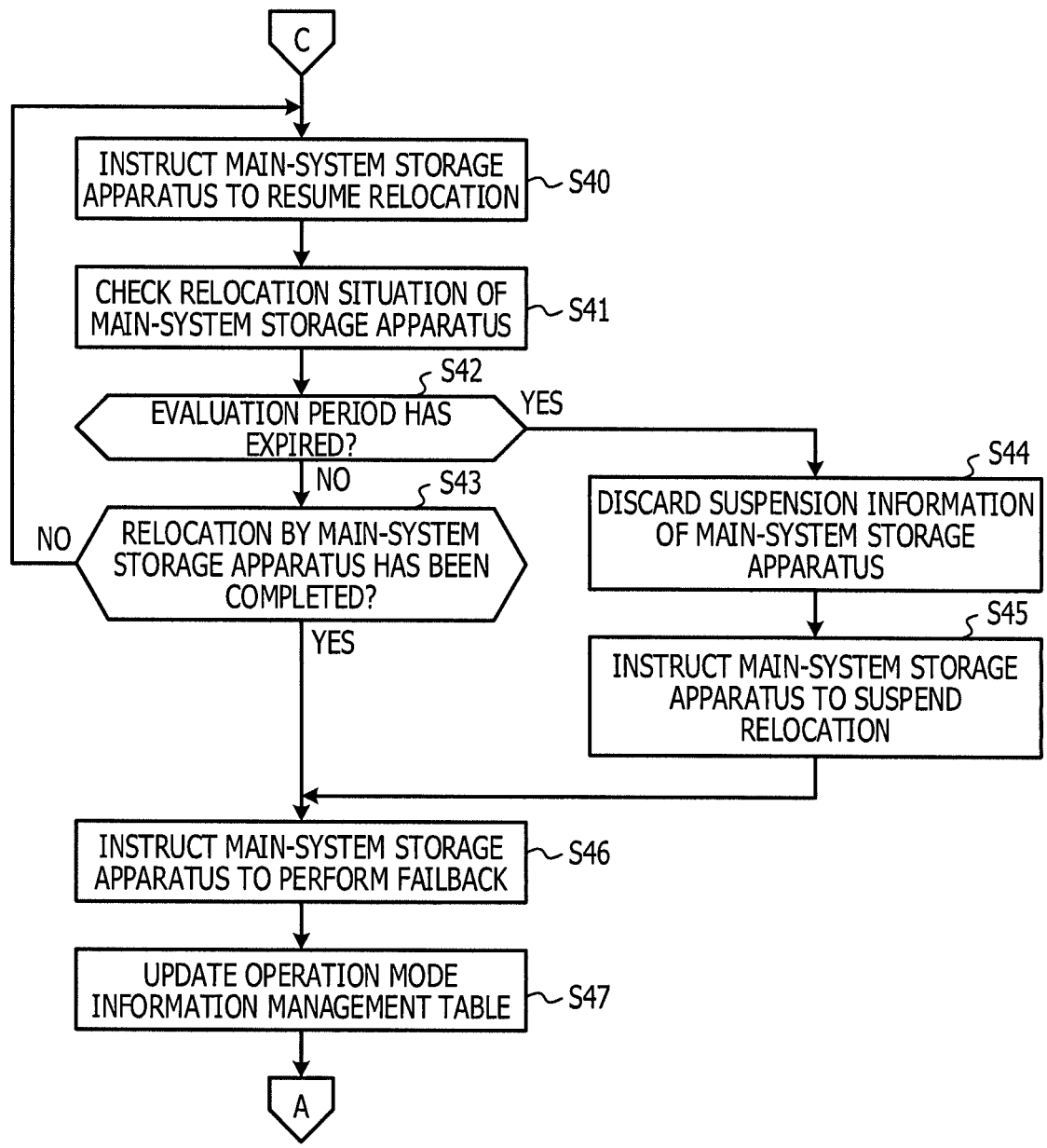
FIG. 17 is a diagram (No. 3) illustrating the flowchart of the management processing according to the second embodiment.

Management processing executed by the storage managing unit 210 in the automated storage tiering is explained with reference to FIGS. 15 to 17. FIG. 15 is a diagram (No. 1) illustrating a flowchart of management processing according to the second embodiment. FIG. 16 is a diagram (No. 2) illustrating the flowchart of the management processing according to the second embodiment. FIG. 17 is a diagram (No. 3) illustrating the flowchart of the management processing according to the second embodiment.

The management processing is processing for managing the progress of the data relocation in the automated storage tiering. The management processing is processing executed by the storage managing unit 210.

[Step S11] The storage managing unit 210 waits for a start instruction for the automated storage tiering from the operation terminal apparatus 12. The storage managing unit 210 proceeds to step S12 when the start instruction for the automated storage tiering is received from the operation terminal apparatus 12.

[Step S12] The storage managing unit 210 notifies the automated storage tiering unit 220 of the start of the automated storage tiering. The automated storage tiering unit 220 receives the notification of the start of the automated storage tiering, starts performance information file creation processing, and creates the performance information file 360 through a predetermined evaluation period. The performance information file 360 is explained below with reference to FIG. 18. The performance information file creation processing is explained below with reference to FIG. 21.

[Step S13] The storage managing unit 210 stays on standby until expiration of the evaluation period and waits for creation of the performance information file 360 by the automated storage tiering unit 220.

[Step S14] The storage managing unit 210 refers to the performance information file 360 created by the automated storage tiering unit 220 and evaluates performance information according to a policy. The performance information is information on an access mode of each of the FTRPEs, for example, information on IOPSs such as an average IOPS and a peak IOPS.

[Step S15] The storage managing unit 210 creates the relocation information file 370 according to an evaluation result of the performance information. The relocation information file 370 records a relocation source sub-pool and a relocation destination sub-pool of each of the FTRPEs (data relocation target blocks) and a relocation situation. The relocation information file 370 is explained below with reference to FIG. 19.

[Step S16] The storage managing unit 210 instructs, via the automated storage tiering unit 220, the main-system storage apparatus (the storage apparatus 20) to start the data relocation (relocation start) and starts clocking of a relocation limit time. The automated storage tiering unit 220 receives the instruction for the relocation start from the storage managing unit 210 to the main-system storage apparatus, instructs the main-system storage apparatus to start the relocation, and returns a response of completion of the relocation instruction to the storage managing unit 210. The storage managing unit 210 waits for the response of the completion of the relocation instruction from the automated storage tiering unit 220 to the main-system storage apparatus and proceeds to step S17.

[Step S17] The storage managing unit 210 instructs, via the automated storage tiering unit 220, the sub-system-storage apparatus (the storage apparatus 40) to start the relocation. The automated storage tiering unit 220 receives the instruction for the relocation start from the storage managing unit 210 to the sub-system-storage apparatus, instructs the sub-system-storage apparatus to start the relocation, and returns a response of completion of the relocation instruction to the storage managing unit 210. The storage managing unit 210 waits for the response of the completion of the relocation instruction from the automated storage tiering unit 220 to the sub-system-storage apparatus and proceeds to step S18.

[Step S18] The storage managing unit 210 instructs, via the automated storage tiering unit 220, the main-system storage apparatus to check a relocation situation. The automated storage tiering unit 220 receives the instruction for the relocation situation check from the storage managing unit 210 to the main-system storage apparatus and instructs the main-system storage apparatus to report the relocation situation. The automated storage tiering unit 220 obtains the report of the relocation situation from the main-system storage apparatus and returns a response of the relocation situation of the main-system storage apparatus to the storage managing unit 210. The storage managing unit 210 waits for the response of the relocation situation of the main-system storage apparatus from the automated storage tiering unit 220 and proceeds to step S19.

[Step S19] The storage managing unit 210 instructs, via the automated storage tiering unit 220, the sub-system-storage apparatus to check a relocation situation. The automated storage tiering unit 220 receives the instruction for the relocation situation check from the storage managing unit 210 to the sub-system-storage apparatus and instructs the sub-system-storage apparatus to report the relocation situation. The automated storage tiering unit 220 obtains the report of the relocation situation from the sub-system-storage apparatus and returns a response of the relocation situation of the sub-system-storage apparatus to the storage managing unit 210. The storage managing unit 210 waits for the response of the relocation situation of the sub-system-storage apparatus from the automated storage tiering unit 220 and proceeds to step S20.

[Step S20] The storage managing unit 210 determines whether the relocation limit time has elapsed. If the relocation limit time has not elapsed, the storage managing unit 210 proceeds to step S21. On the other hand, if the relocation limit time has elapsed, that is, if the suspension condition for the data relocation is satisfied, the storage managing unit 210 proceeds to step S25.

[Step S21] The storage managing unit 210 determines, from the relocation situation obtained by the response, whether the main-system storage apparatus has completed the data relocation (relocation completion). If the main-system storage apparatus has completed the data relocation, the storage managing unit 210 proceeds to step S22. If the main-system storage apparatus has not completed the data relocation, the storage managing unit 210 proceeds to step S23.

[Step S22] The storage managing unit 210 determines whether the main-system storage apparatus is in the active state, that is, the main-system storage apparatus is the active-system storage apparatus. If the main-system storage apparatus is not in the active state, the storage managing unit 210 proceeds to step S23. On the other hand, if the main-system storage apparatus is in the active state, the storage managing unit 210 ends progress management for the present data relocation and proceeds to step S13 in preparation for progress management for the next data relocation.

[Step S23] The storage managing unit 210 determines, from the relocation situation obtained by the response, whether the sub-system-storage apparatus has completed the data relocation. If the sub-system-storage apparatus has completed the data relocation, the storage managing unit 210 proceeds to step S24. On the other hand, if the sub-system-storage apparatus has not completed the data relocation, the storage managing unit 210 proceeds to step S18 in order to check relocation situations of the main-system storage apparatus and the sub-system-storage apparatus.

[Step S24] The storage managing unit 210 determines whether the sub-system-storage apparatus is in the active state. If the sub-system-storage apparatus is in the active state, the storage managing unit 210 proceeds to step S13. If the sub-system-storage apparatus is not in the active state, the storage managing unit 210 proceeds to step S18.

In this way, the storage managing unit 210 may manage the progress of the data relocation by executing the processing in steps S11 to S24 as long as the suspension condition for the data relocation is not satisfied. If the suspension condition for the data relocation is satisfied, the storage managing unit 210 may proceed with the data relocation without imposing a load on the storage system 10 by further executing the processing in step S25 and subsequent steps.

[Step S25] The storage managing unit 210 determines whether the sub-system-storage apparatus is in the active state. If the sub-system-storage apparatus is in the active state, the storage managing unit 210 proceeds to step S26. If the sub-system-storage apparatus is not in the active state, the storage managing unit 210 proceeds to step S27.

[Step S26] The storage managing unit 210 instructs, via the automated storage tiering unit 220, the sub-system-storage apparatus to suspend the data relocation (relocation suspension). After instructing the relocation suspension, the storage managing unit 210 ends progress management for the present data relocation and proceeds to step S13 in preparation for progress management for the next data relocation. Note that the storage managing unit 210 ends the progress management for the present data relocation by determining that the sub-system-storage apparatus is not in a situation in which the data relocation may be continued because it is likely that the sub-system-storage apparatus is not in the active state, that is, the main-system storage apparatus is not normal.

The automated storage tiering unit 220 receives the instruction for the relocation suspension from the storage managing unit 210 to the sub-system-storage apparatus and instructs the sub-system-storage apparatus to suspend the relocation. The sub-system-storage apparatus receives the instruction for the relocation suspension from the automated storage tiering unit 220 and suspends the data relocation.

[Step S27] The storage managing unit 210 instructs, via the automated storage tiering unit 220, the main-system storage apparatus to suspend the relocation. The automated storage tiering unit 220 receives the instruction for the relocation suspension from the storage managing unit 210 to the main-system storage apparatus and instructs the main-system storage apparatus to suspend the relocation. The main-system storage apparatus receives the instruction for the relocation suspension from the automated storage tiering unit 220 and suspends the data relocation.

[Step S28] The storage managing unit 210 creates the suspension information file 380 based on the relocation situation of the main-system storage apparatus. The suspension information file 380 records the FTRPEs for which the main-system storage apparatus has not completed the data relocation (data relocation uncompleted blocks). The suspension information file 380 is explained below with reference to FIG. 20.

[Step S29] The storage managing unit 210 instructs, via the automated storage tiering unit 220, the sub-system-storage apparatus to check a relocation situation. The automated storage tiering unit 220 receives the instruction for the relocation situation check from the storage managing unit 210 to the sub-system-storage apparatus and instructs the sub-system-storage apparatus to report the relocation situation. The automated storage tiering unit 220 obtains the report of the relocation situation from the sub-system-storage apparatus and returns a response of the relocation situation of the sub-system-storage apparatus to the storage managing unit 210. The storage managing unit 210 waits for the response of the relocation situation of the sub-system-storage apparatus from the automated storage tiering unit 220 and proceeds to step S30.

[Step S30] The storage managing unit 210 determines whether the evaluation period has expired. If the evaluation period has expired, the storage managing unit 210 proceeds to step S31. If the evaluation period has not expired, the storage managing unit 210 proceeds to step S34.

[Step S31] The storage managing unit 210 discharges the suspension information of the main-system storage apparatus, that is, the suspension information file 380.

[Step S32] The storage managing unit 210 instructs, via the automated storage tiering unit 220, the sub-system-storage apparatus to suspend the relocation. The automated storage tiering unit 220 receives the instruction for the relocation suspension from the storage managing unit 210 to the sub-system-storage apparatus and instructs the sub-system-storage apparatus to suspend the relocation. The sub-system-storage apparatus receives the instruction for the relocation suspension from the automated storage tiering unit 220 and suspends the data relocation.

Consequently, in the storage system 10, both of the main-system storage apparatus and the sub-system-storage apparatus suspend the data relocation. The data relocation is suspended in this way because it is desirable to execute the data relocation based on new performance evaluation generated according to the expiration of the evaluation period instead of the data relocation based on old performance evaluation.

[Step S33] The storage managing unit 210 stores a present status in the operation mode information management table 350, ends progress management for the present data relocation, and proceeds to step S13 in preparation for progress management for the next data relocation.

[Step S34] The storage managing unit 210 determines, from the relocation situation obtained by the response, whether the sub-system-storage apparatus has completed the data relocation. If the sub-system-storage apparatus has not completed the data relocation, the storage managing unit 210 proceeds to step S29. That is, the storage managing unit 210 waits for completion of the data relocation by the sub-system-storage apparatus until the evaluation period expires. On the other hand, if the sub-system-storage apparatus has completed the data relocation, the storage managing unit 210 proceeds to step S35.

[Step S35] The storage managing unit 210 instructs the sub-system-storage apparatus to perform failover. The sub-system-storage apparatus receives the instruction for the failover and switches from the standby state to the active state. The main-system storage apparatus switches from the active state to the standby state in synchronization with the sub-system-storage apparatus. The sub-system-storage apparatus notifies the storage managing unit 210 of success or failure of the failover.

[Step S36] The storage managing unit 210 receives the notification of success or failure of the failover and stores a present status in the operation mode information management table 350.

[Step S37] The storage managing unit 210 checks success or failure of the failover. If the sub-system-storage apparatus fails in the failover, the storage managing unit 210 proceeds to step S38. If the sub-system-storage apparatus succeeds in the failover, the storage managing unit 210 proceeds to step S39.

[Step S38] Since the sub-system-storage apparatus fails in the failover, the storage managing unit 210 discards the suspension information of the main-system storage apparatus, that is, the suspension information file 380. The storage managing unit 210 ends progress management for the present data relocation and proceeds to step S13 in preparation for progress management for the next data relocation.

[Step S39] Since the sub-system-storage apparatus succeeds in the failover, the storage managing unit 210 acquires the FTRPEs for which the main-system-storage apparatus has not completed the data relocation (suspension information), from the suspension information file 380.

[Step S40] The storage managing unit 210 instructs, via the automated storage tiering unit 220, the main-system storage apparatus to resume the data relocation based on the suspension information (relocation resumption). The main-system storage apparatus receives the instruction for the relocation resumption from the automated storage tiering unit 220 and resumes the data relocation based on the suspension information.

[Step S41] The storage managing unit 210 instructs, via the automated storage tiering unit 220, the main-system storage apparatus to check a relocation situation. The automated storage tiering unit 220 receives the instruction for the relocation situation check from the storage managing unit 210 to the main-system storage apparatus and instructs the main-system storage apparatus to report the relocation situation. The automated storage tiering unit 220 obtains the report of the relocation situation from the main-system storage apparatus and returns a response of the relocation situation of the main-system storage apparatus to the storage managing unit 210. The storage managing unit 210 waits for the response of the relocation situation of the main-system storage apparatus from the automated storage tiering unit 220 and proceeds to step S42.

[Step S42] The storage managing unit 210 determines whether the evaluation period has expired. If the evaluation period has not expired, the storage managing unit 210 proceeds to step S43. If the evaluation period has expired, the storage managing unit 210 proceeds to step S44.

[Step S43] The storage managing unit 210 determines, from the relocation situation obtained by the response, whether the main-system storage apparatus has completed the data relocation. If the main-system storage apparatus has not completed the data relocation, the storage managing unit 210 proceeds to step S40. That is, the storage managing unit 210 waits for the completion of the data relocation by the main-system storage apparatus until the evaluation period expires. On the other hand, if the main-system storage apparatus has completed the data relocation, the storage managing unit 210 proceeds to step S46.

[Step S44] The storage managing unit 210 discards the suspension information of the main-system storage apparatus, that is, the suspension information file 380.

[Step S45] The storage managing unit 210 instructs, via the automated storage tiering unit 220, the main-system storage apparatus to suspend the relocation. The automated storage tiering unit 220 receives the instruction for the relocation suspension from the storage managing unit 210 to the main-system storage apparatus and instructs the main-system storage apparatus to suspend the relocation. The main-system storage apparatus receives the instruction for the relocation suspension from the automated storage tiering unit 220 and suspends the data relocation.

[Step S46] The storage managing unit 210 instructs the main-system storage apparatus to perform failback. The main-system storage apparatus receives the instruction for the failback and switches from the standby state to the active state. The sub-system-storage apparatus switches from the active state to the standby state in synchronization with the main-system storage apparatus. The main-system storage apparatus notifies the storage managing unit 210 of success or failure of the failback.

[Step S47] The storage managing unit 210 receives the notification of success or failure of the failback and stores a present status in the operation mode information management table 350. The storage managing unit 210 ends progress management for the present data relocation and proceeds to steps S13 in preparation for progress management for the next data relocation.

In this way, the storage system 10 may increase a completion opportunity of the data relocation even if the data relocation is suspended. The storage system 10 may realize expected access performance while responding to an access from the job server 14.

The performance information file 360 is explained with reference to FIG. 18. FIG. 18 is a diagram illustrating an example of the performance information file according to the second embodiment.

The performance information file 360 records information on an access mode of each of the FTRPEs. The performance information file 360 includes, as items, an FTRPE number, an average IOPS, a peak IOPS, and a measurement time (H). The FTRPE number indicates information capable of specifying the FTRPE. The average IOPS indicates an average of IOPSs in a measurement time (an evaluation period). The peak IOPS indicates a peak value of the IOPSs in the measurement time. The measurement time (H) indicates the measurement time of the IOPS in units of hour.

For example, in the FIVE #1, the average IOPS is "1000" and the peak IOPS is "3000" in the measurement time of five hours. According to the performance information file 360, when a policy for setting the evaluation standard as an average is applied, the storage managing unit 210 performs allocation of storage resources having higher access speeds in the order of the FTRPE #1, the FTRPE #2, the FTRPE #3, and the FTRPE #4. According to the performance information file 360, when a policy for setting the evaluation standard as a peak is applied, the storage managing unit 210 performs allocation of storage resources having higher access speeds in the order of the FTRPE #1, the FTRPE #3, the FTRPE #2, and the FTRPE #4.

The relocation information file 370 is explained with reference to FIG. 19. FIG. 19 is a diagram illustrating an example of the relocation information file according to the second embodiment.

The relocation information file 370 records a relocation source sub-pool and a relocation destination sub-pool for each of the FTRPEs and a relocation situation. The relocation information file 370 includes, as items, an FTRPE number, the relocation source sub-pool, the relocation destination sub-pool, and the relocation situation. The relocation source sub-pool is information capable of specifying a relocation source of data. The relocation destination sub-pool is information capable of specifying a relocation destination of the data. The relocation situation indicates a progress situation (a relocation situation) of the data relocation for each of the FTRPEs. As the relocation situation, there are completed, under execution, uncompleted, and the like.

For example, the relocation information file 370 indicates that relocation from the sub-pool #01_L to the sub-pool #01_H has been completed for the FTRPE #1. The relocation information file 370 indicates that relocation from the sub-pool #01_H to the sub-pool #01_M is under execution for the FTRPE #2. The relocation information file 370 indicates that relocation from the sub-pool #01_M to the sub-pool #01_L is uncompleted for the FTRPE #3 and indicates that relocation from the sub-pool #01_H to the sub-pool #01_L is uncompleted for the FTRPE #4.

The suspension information file 380 is explained with reference to FIG. 20. FIG. 20 is a diagram illustrating an example of the suspension information file according to the second embodiment.

The suspension information file 380 records the FTRPEs for which the main-system storage apparatus has not completed the data relocation. The suspension information file 380 includes, as items, an FTRPE number, a relocation source sub-pool, and a relocation destination sub-pool.

For example, the suspension information file 380 indicates that the FTRPE #3 and the FTRPE #4 are uncompleted because of suspension of the data relocation. In the FTRPE #3, the data relocation from the sub-pool #01_M to the sub-pool #01_L is uncompleted. In the FTRPE #4, the data relocation from the sub-pool #01_H to the sub-pool #01_L is uncompleted.

Figure 21:
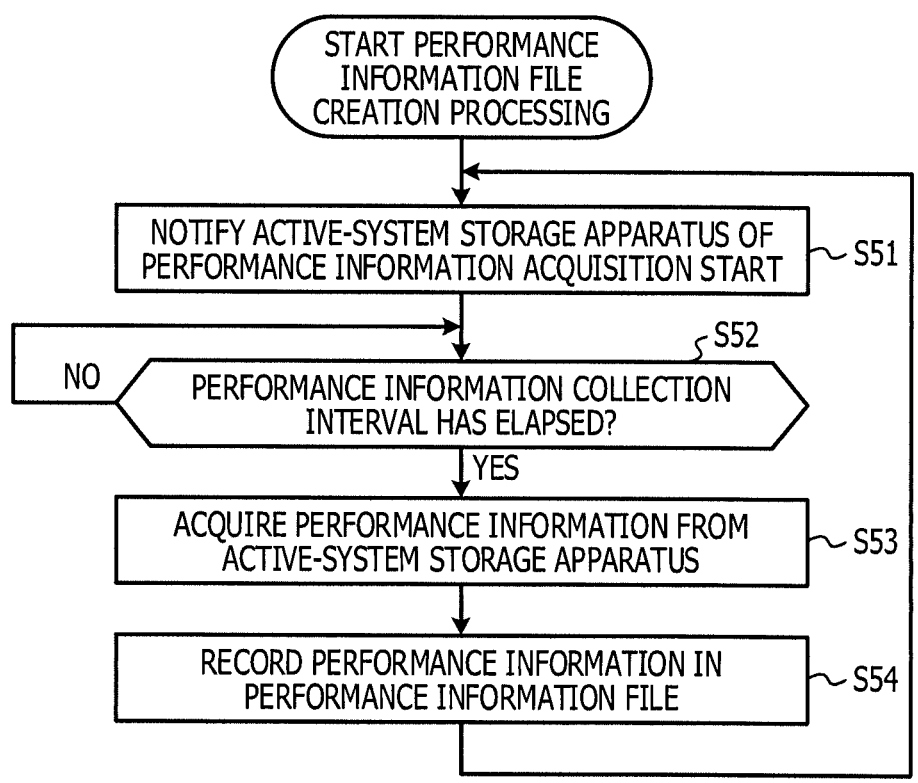
FIG. 21 is a diagram illustrating a flowchart of performance information file creation processing according to the second embodiment.

The performance information file creation processing is explained with reference to FIG. 21. FIG. 21 is a diagram illustrating a flowchart of the performance information file creation processing according to the second embodiment.

The performance information file creation processing is processing for creating the performance information file 360. The automated storage tiering unit 220 receives notification of a start of the automated storage tiering from the storage managing unit 210 and executes the performance information file creation processing.

[Step S51] The automated storage tiering unit 220 notifies the storage apparatus in the active state (the active-system storage apparatus) of an acquisition start of performance information.

[Step S52] The automated storage tiering unit 220 determines whether a performance information collection interval has elapsed. The performance information collection interval is an interval at which the automated storage tiering unit 220 collects performance information from the working storage apparatus. For example, thirty minutes is set as the performance information collection interval. The automated storage tiering unit 220 waits for the elapse of the performance information collection interval. If the performance information collection interval elapses, the automated storage tiering unit 220 proceeds to step S53.

[Step S53] The automated storage tiering unit 220 acquires performance information from the active-system storage apparatus.

[Step S54] The automated storage tiering unit 220 records the collected performance information in the performance information file 360 and proceeds to step S51.

In this way, the automated storage tiering unit 220 may record the performance information of the active-system storage apparatus in the performance information file 360. The performance information in the performance information file 360 may be referred to by the storage managing unit 210.

Note that the processing functions explained above may be realized by a computer. In that case, a computer program describing processing contents of functions that the first-system storage apparatus 2, the second-system storage apparatus 3, the storage management apparatus 4, the storage apparatuses 20 and 40, and the operation management server 100 may include is provided. The processing functions are realized on the computer by executing the computer program with the computer. The computer program describing the processing content may be recorded in a computer-readable recording medium. As the computer-readable recording medium, there are a magnetic storage device, an optical disk, a magneto-optical recording medium, a semiconductor memory, and the like. As the magnetic storage device, there are a hard disk device (HDD), a flexible disk (FD), a magnetic tape, and the like. As the optical disk, there are a DVD, a DVD-RAM, a CD-ROM/RW, and the like. As the magneto-optical recording medium, there are an magneto-optical disk (MO), and the like.

When the computer program is distributed, for example, portable recording media such as a DVD and a CD-ROM on which the computer program is recorded are sold. The computer program may be stored in a storage of a server computer and transferred from the server computer to other computers via a network.

The computer that executes the computer program stores, in a storage of the computer, the computer program recorded in the portable recording medium or the computer program transferred from the server computer. The computer reads the computer program from the storage of the computer and executes processing conforming to the computer program. Note that the computer may also read the computer program directly from the portable recording medium and execute the processing conforming to the computer program. Every time the computer program is transferred from the server computer coupled via the network, the computer may also sequentially execute the processing conforming to the received computer program.

At least a part of the processing functions may be realized by an electronic circuit such as a DSP, an ASIC, or a PLD.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage system comprising:
    a first storage apparatus including a first storage portion and a second storage portion, the first storage portion being accessible at first access speed higher than second access speed at which the second storage portion is accessible;
    a second storage apparatus including a third storage portion and a fourth storage portion, the third storage portion being accessible at third access speed higher than fourth access speed at which the fourth storage portion is accessible, the second storage apparatus being configured to store data that is the same as data stored in the first storage device; and
    a storage management apparatus including a memory and a processor coupled to the memory, the processor being configured to execute processing,
    wherein the processing includes:
        executing first processing that includes
            controlling the first storage apparatus in an active state, and
            controlling the second storage apparatus in a standby state;
        executing second processing that includes
            causing the first storage apparatus to initiate an execution of first data relocation processing between the first storage portion and the second storage portion, and
            causing the second storage apparatus to initiate an execution of second data relocation processing between the third storage portion and the fourth storage portion;
        executing third processing when the first data relocation processing is not completed and the second data relocation processing is not completed when a first condition is satisfied, the third processing including causing the first storage apparatus to suspend the first data relocation processing and causing the second storage apparatus to continue the second data relocation processing;
        executing fourth processing when the second data relocation processing is completed after the third processing, the fourth processing including switching the first storage apparatus from the active state to the standby state and switching the second storage apparatus from the standby state to the active state; and
        executing fifth processing after the first storage apparatus switches from the active state to the standby state by the fourth processing, the fifth processing including causing the first storage apparatus to resume the first data relocation processing.

2. The storage system according to claim 1, wherein the processor is configured to, after the first data relocation processing is completed, switch the second storage apparatus from the active state to the standby state and switch the first storage apparatus from the standby state to the active state.

3. The storage system according to claim 1, wherein the processor is configured to:
    monitor an access situation in a first period for each of blocks which are storage resource allocation units in each of the first storage apparatus and the second storage apparatus,
    in each of the first storage apparatus and the second storage apparatus, specify a data relocation target block as a target for data relocation among the plurality of blocks based on the access situations in the first period, and
    cause the first storage apparatus and the second storage apparatus to execute the first data relocation processing and the second data relocation processing on the data relocation target block.

4. The storage system according to claim 3, wherein the access situation is an access frequency,
    when the access frequency of the data relocation target block is lower than a first value, the data relocation target block is located in the second storage portion and the fourth storage portion by the first data relocation processing and the second data relocation processing, and
    when the access frequency of the data relocation target block is higher than the first value, the data relocation target block is located in the first storage portion and the third storage portion by the first data relocation processing and the second data relocation processing.

5. The storage system according to claim 4, wherein the processor is configured to:
when a second period after the first period expires, cause at least one of the first storage apparatus and the second storage apparatus to suspend at least one of the first data relocation processing and the second data relocation processing on the data relocation target block,
monitor the access frequency in the second period for each of the blocks, and
based on the access frequency in the second period, cause at least one of the first storage apparatus and the second storage apparatus to resume at least one of the first data relocation processing and the second data relocation processing.

6. The storage system according to claim 3, wherein the processor is configured to:
when causing the first storage apparatus to suspend the first data relocation processing, generate suspension information indicating a data relocation uncompleted block for which the relocation of the data is uncompleted, and
when causing the first storage apparatus to resume the first data relocation processing, cause the first storage apparatus to resume the first data relocation processing on the data relocation uncompleted block based on the suspension information.

7. The storage system according to claim 1, wherein the first condition is that a first time elapses after the second processing is executed.

8. A storage management apparatus configured to control a first storage apparatus including a first storage portion and a second storage portion and a second storage apparatus including a third storage portion and a fourth storage portion, the first storage portion being accessible at first access speed higher than second access speed at which the second storage portion is accessible, the third storage portion being accessible at third access speed higher than fourth access speed at which the fourth storage portion is accessible, and the second storage apparatus configured to store data that is the same as data stored in the first storage device, a storage management apparatus comprising:
a memory; and
a processor coupled to the memory, the processor being configured to execute processing,
wherein the processing includes:
executing first processing that includes
controlling the first storage apparatus in an active state, and
controlling the second storage apparatus in a standby state;
executing second processing that includes
causing the first storage apparatus to initiate an execution of first data relocation processing between the first storage portion and the second storage portion, and
causing the second storage apparatus to initiate an execution of second data relocation processing between the third storage portion and the fourth storage portion;
executing third processing when the first data relocation processing is not completed and the second data relocation processing is not completed when a first condition is satisfied, the third processing including causing the first storage apparatus to suspend the first data relocation processing and causing the second storage apparatus to continue the second data relocation processing;
executing fourth processing when the second data relocation processing is completed after the third processing, the fourth processing including switching the first storage apparatus from the active state to the standby state and switching the second storage apparatus from the standby state to the active state; and
executing fifth processing after the first storage apparatus switches from the active state to the standby state by the fourth processing, the fifth processing including causing the first storage apparatus to resume the first data relocation processing.

9. The storage management apparatus according to claim 8, wherein
the processor is configured to, after the first data relocation processing is completed, switch the second storage apparatus from the active state to the standby state and switch the first storage apparatus from the standby state to the active state.

10. The storage management apparatus according to claim 8, wherein the processor is configured to:
monitor an access situation in a first period for each of blocks which are storage resource allocation units in each of the first storage apparatus and the second storage apparatus,
in each of the first storage apparatus and the second storage apparatus, specify a data relocation target block as a target for data relocation among the plurality of blocks based on the access situations in the first period, and
cause the first storage apparatus and the second storage apparatus to execute the first data relocation processing and the second data relocation processing on the data relocation target block.

11. The storage management apparatus according to claim 10, wherein
the access situation is an access frequency,
when the access frequency of the data relocation target block is lower than a first value, the data relocation target block is located in the second storage portion and the fourth storage portion by the first data relocation processing and the second data relocation processing, and
when the access frequency of the data relocation target block is higher than the first value, the data relocation target block is located in the first storage portion and the third storage portion by the first data relocation processing and the second data relocation processing.

12. The storage management apparatus according to claim 11, wherein the processor is configured to:
when a second period after the first period expires, cause at least one of the first storage apparatus and the second storage apparatus to suspend at least one of the first data relocation processing and the second data relocation processing on the data relocation target block,
monitor the access frequency in the second period for each of the blocks, and
based on the access frequency in the second period, cause at least one of the first storage apparatus and the second storage apparatus to resume at least one of the first data relocation processing and the second data relocation processing.

13. The storage management apparatus according to claim 10, wherein the processor is configured to:
when causing the first storage apparatus to suspend the first data relocation processing, generate suspension information indicating a data relocation uncompleted block for which the relocation of the data is uncompleted, and when causing the first storage apparatus to resume the first data relocation processing, cause the first storage apparatus to resume the first data relocation processing on the data relocation uncompleted block based on the suspension information.

14. The storage management apparatus according to claim 8, wherein
the first condition is that a first time elapses after the second processing is executed.

15. A non-transitory computer-readable storage medium storing a program that causes a storage management apparatus to execute a process, the storage management apparatus being configured to control a first storage apparatus including a first storage portion and a second storage portion and a second storage apparatus including a third storage portion and a fourth storage portion, the first storage portion being accessible at first access speed higher than second access speed at which the second storage portion is accessible, the third storage portion being accessible at third access speed higher than fourth access speed at which the fourth storage portion is accessible, and the second storage apparatus configured to store data that is the same as data stored in the first storage device, the process comprising:

executing first processing that includes
controlling the first storage apparatus in an active state, and
controlling the second storage apparatus in a standby state;

executing second processing that include
causing the first storage apparatus to initiate an execution of first data relocation processing between the first storage portion and the second storage portion, and
causing the second storage apparatus to initiate an execution of second data relocation processing between the third storage portion and the fourth storage portion;

executing third processing when the first data relocation processing is not completed and the second data relocation processing is not completed when a first condition is satisfied, the third processing including causing the first storage apparatus to suspend the first data relocation processing and causing the second storage apparatus to continue the second data relocation processing;

executing fourth processing when after the second data relocation processing is completed after the third processing, the fourth processing including switching the first storage apparatus from the active state to the standby state and switching the second storage apparatus from the standby state to the active state; and executing fifth processing after the switching of the first storage apparatus from the active state to the standby state by the fourth processing, the fifth processing including causing the first storage apparatus to resume the first data relocation processing.

16. The non-transitory computer-readable storage medium according to claim 15, wherein the process further comprises:
after the first data relocation processing is completed, switching the second storage apparatus from the active state to the standby state and switching the first storage apparatus from the standby state to the active state.

17. The non-transitory computer-readable storage medium according to claim 15, wherein the process further comprises:
monitoring an access situation in a first period for each of blocks which are storage resource allocation units in each of the first storage apparatus and the second storage apparatus;
in each of the first storage apparatus and the second storage apparatus, specifying a data relocation target block as a target for data relocation among the plurality of blocks based on the access situations in the first period; and
causing the first storage apparatus and the second storage apparatus to execute the first data relocation processing and the second data relocation processing on the data relocation target block.

18. The non-transitory computer-readable storage medium according to claim 17, wherein
the access situation is an access frequency,
when the access frequency of the data relocation target block is lower than a first value, the data relocation target block is located in the second storage portion and the fourth storage portion by the first data relocation processing and the second data relocation processing, and
when the access frequency of the data relocation target block is higher than the first value, the data relocation target block is located in the first storage portion and the third storage portion by the first data relocation processing and the second data relocation processing.

19. The non-transitory computer-readable storage medium according to claim 18, wherein the process further comprises:
when a second period after the first period expires, causing at least one of the first storage apparatus and the second storage apparatus to suspend at least one of the first data relocation processing and the second data relocation processing on the data relocation target block;
monitoring the access frequency in the second period for each of the blocks; and
based on the access frequency in the second period, causing at least one of the first storage apparatus and the second storage apparatus to resume at least one of the first data relocation processing and the second data relocation processing.

20. The non-transitory computer-readable storage medium according to claim 15, wherein
the first condition is that a first time elapses after the second processing is executed.

* * * * *